April 1, 1958   C. H. BERGSLAND ET AL   2,828,592
COMPONENT PREPARATION MACHINE
Filed Oct. 21, 1955   11 Sheets-Sheet 4
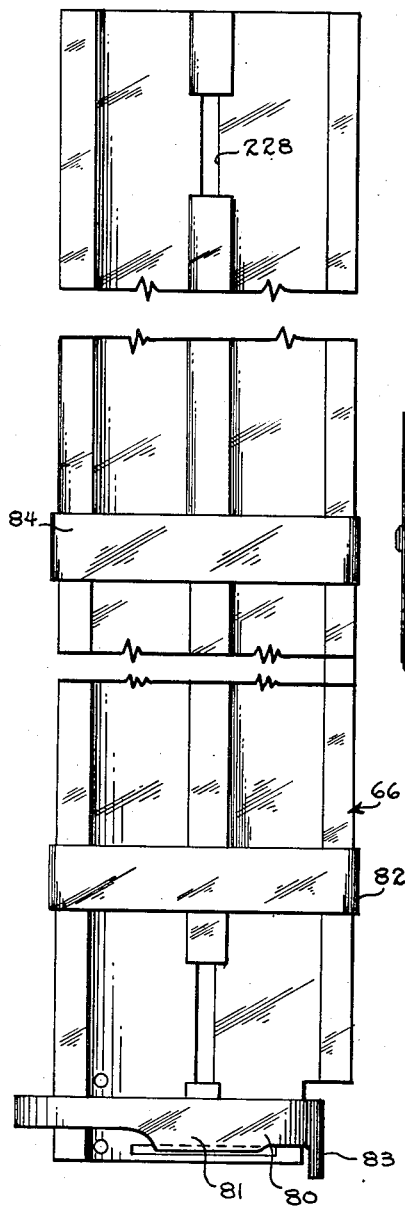
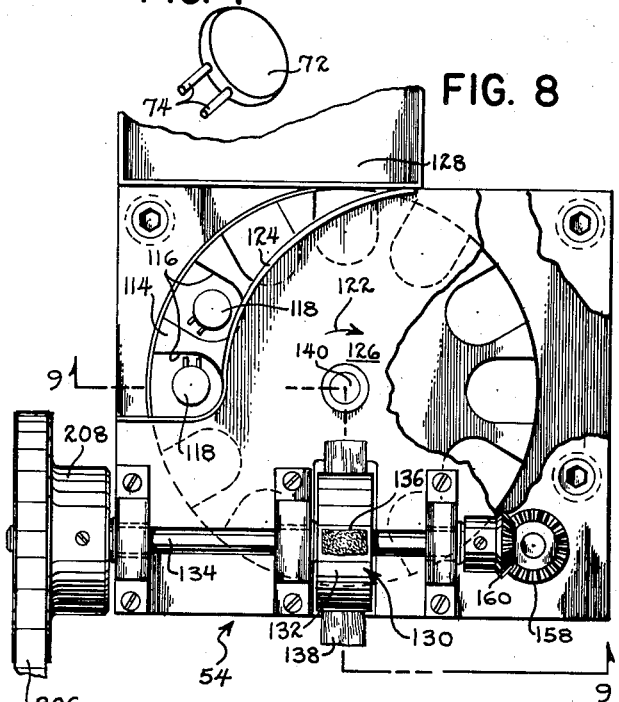
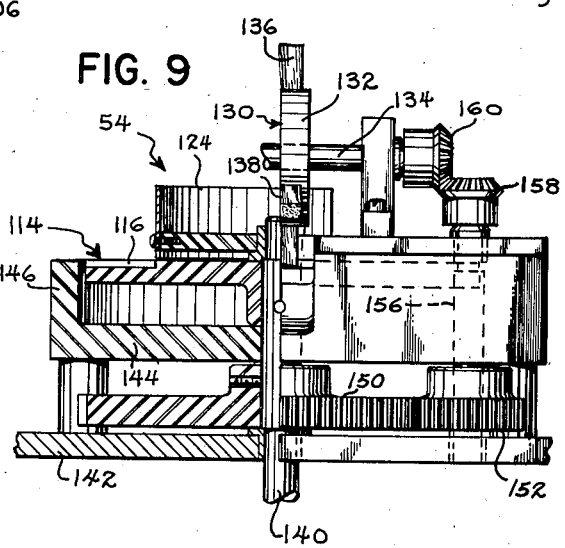
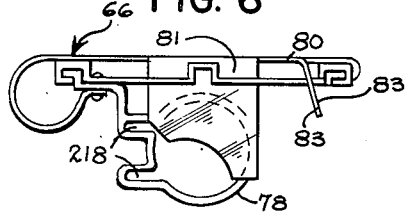
INVENTORS
CHARLES H. BERGSLAND
RAYMOND S. KARINEN
DORA M. SORENSEN
WILLIAM J. JEFFREY
WALTER H. NEUMEISTER
BY William C. Strieber
ATTORNEY

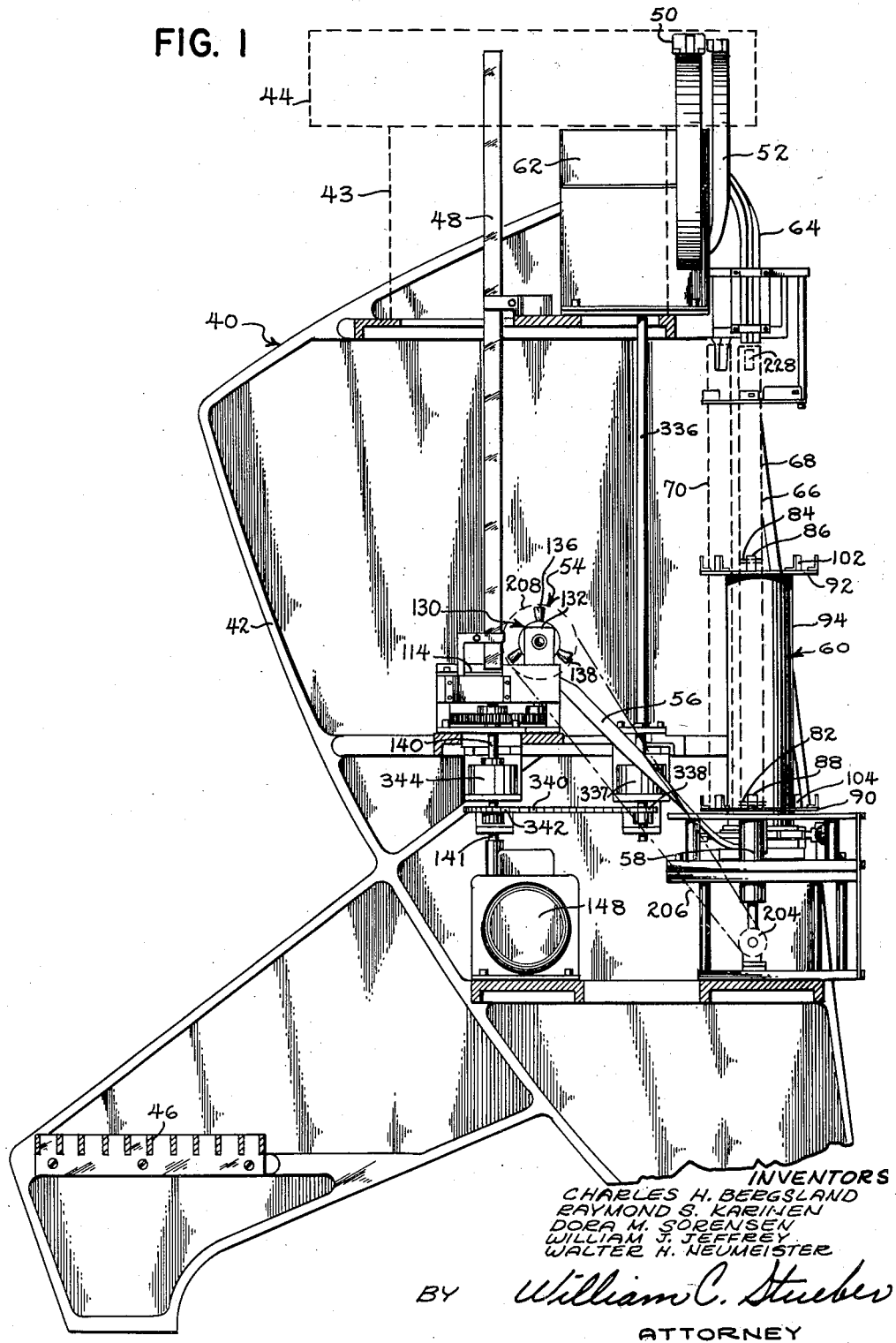

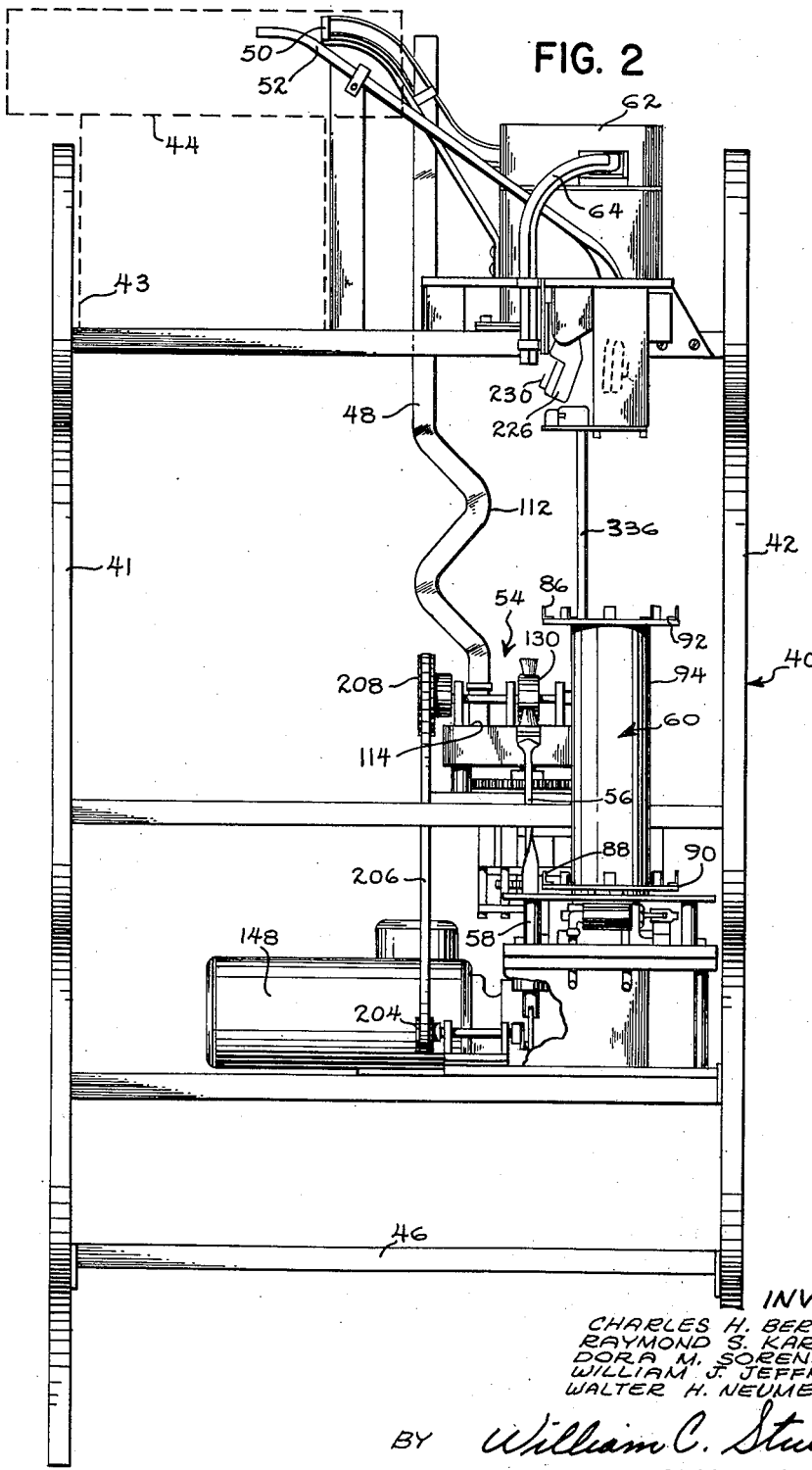

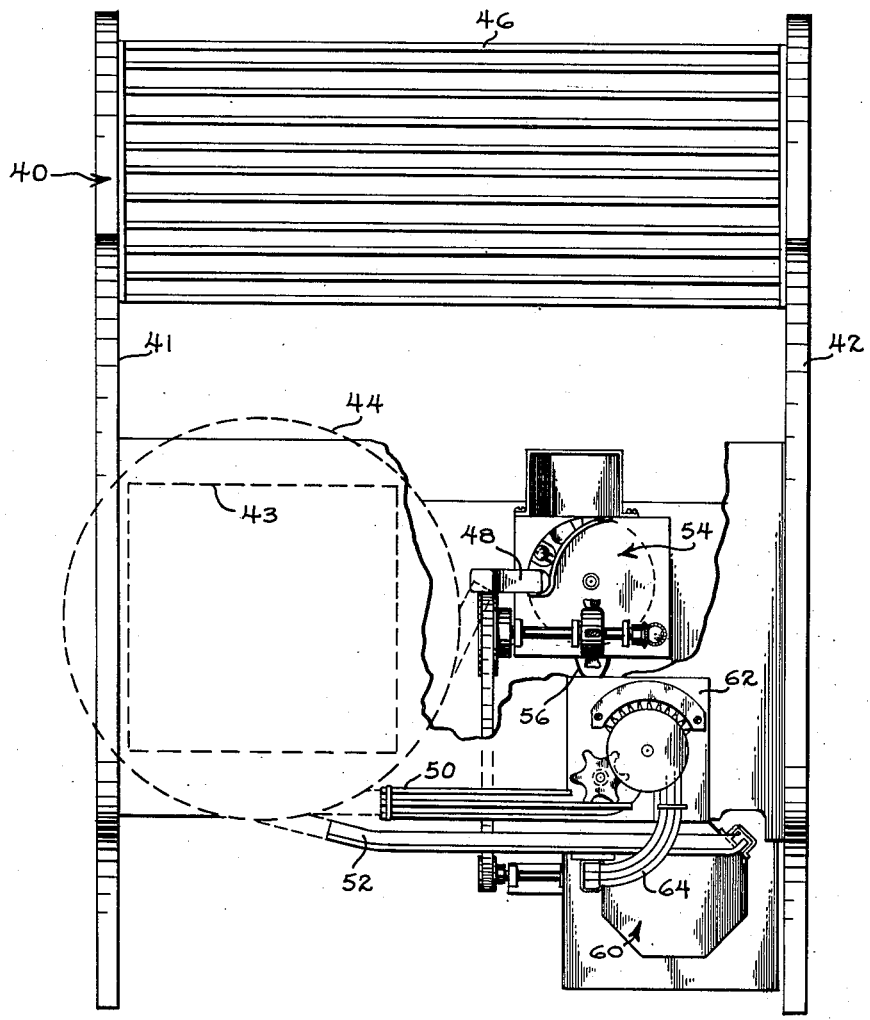

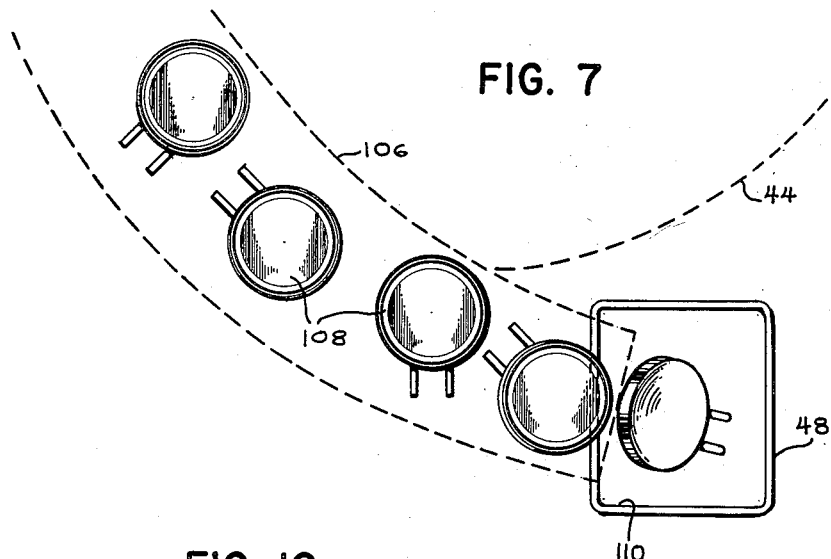
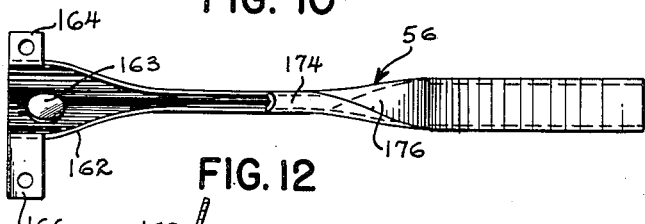
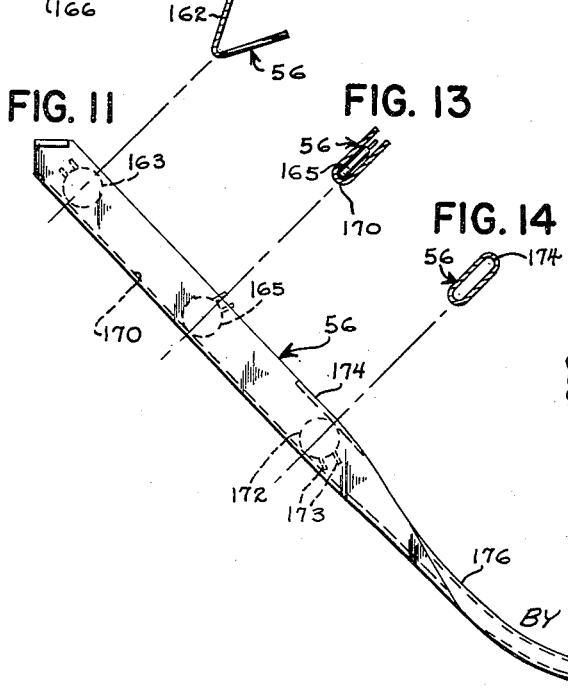
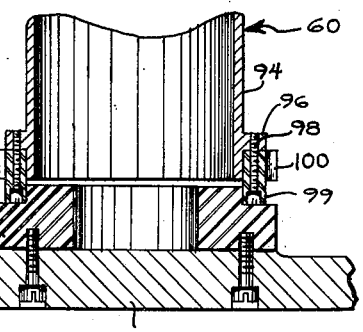

April 1, 1958 C. H. BERGSLAND ET AL 2,828,592
COMPONENT PREPARATION MACHINE
Filed Oct. 21, 1955 11 Sheets-Sheet 6
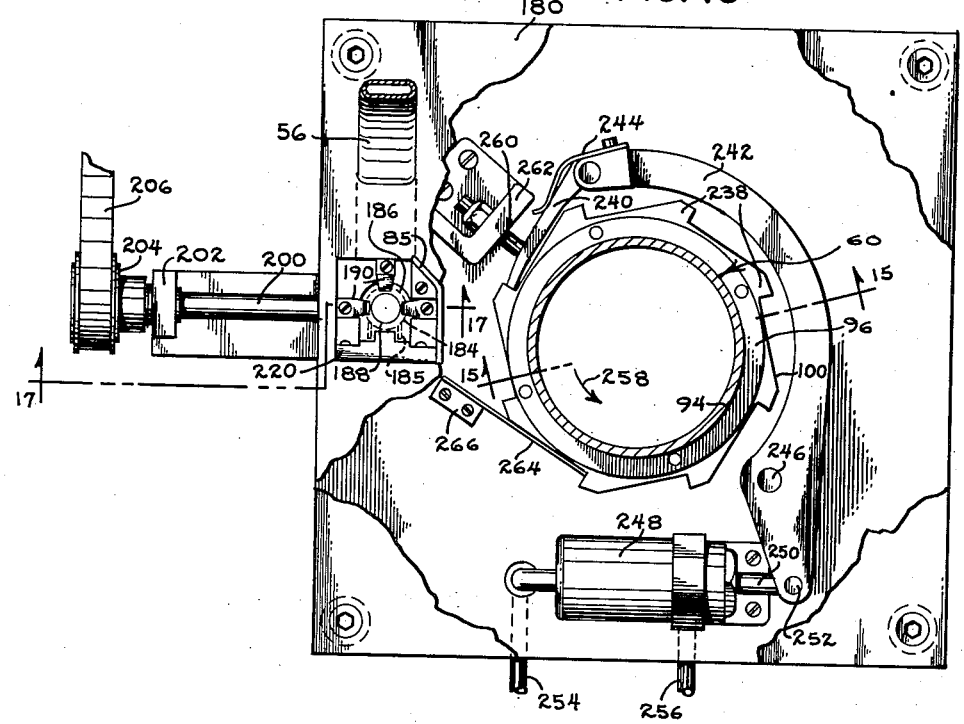
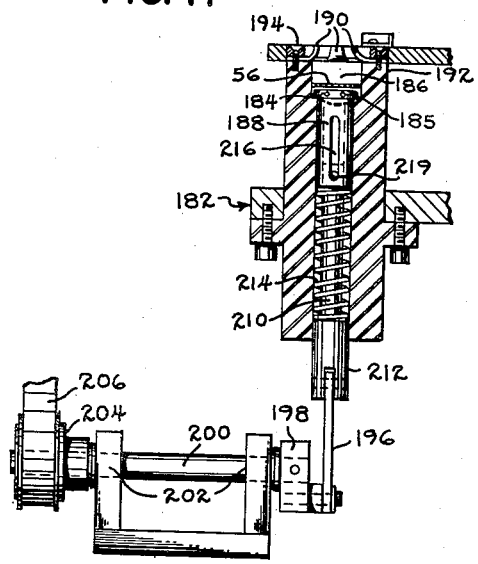
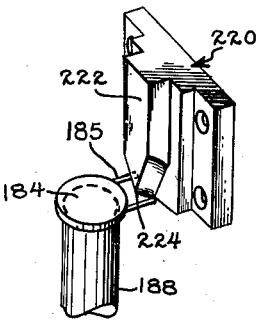
INVENTORS
CHARLES H. BERGSLAND
RAYMOND S. KARINEN
DORA M. SORENSEN
WILLIAM J. JEFFREY
WALTER H. NEUMEISTER
BY William C. Stueber
ATTORNEY

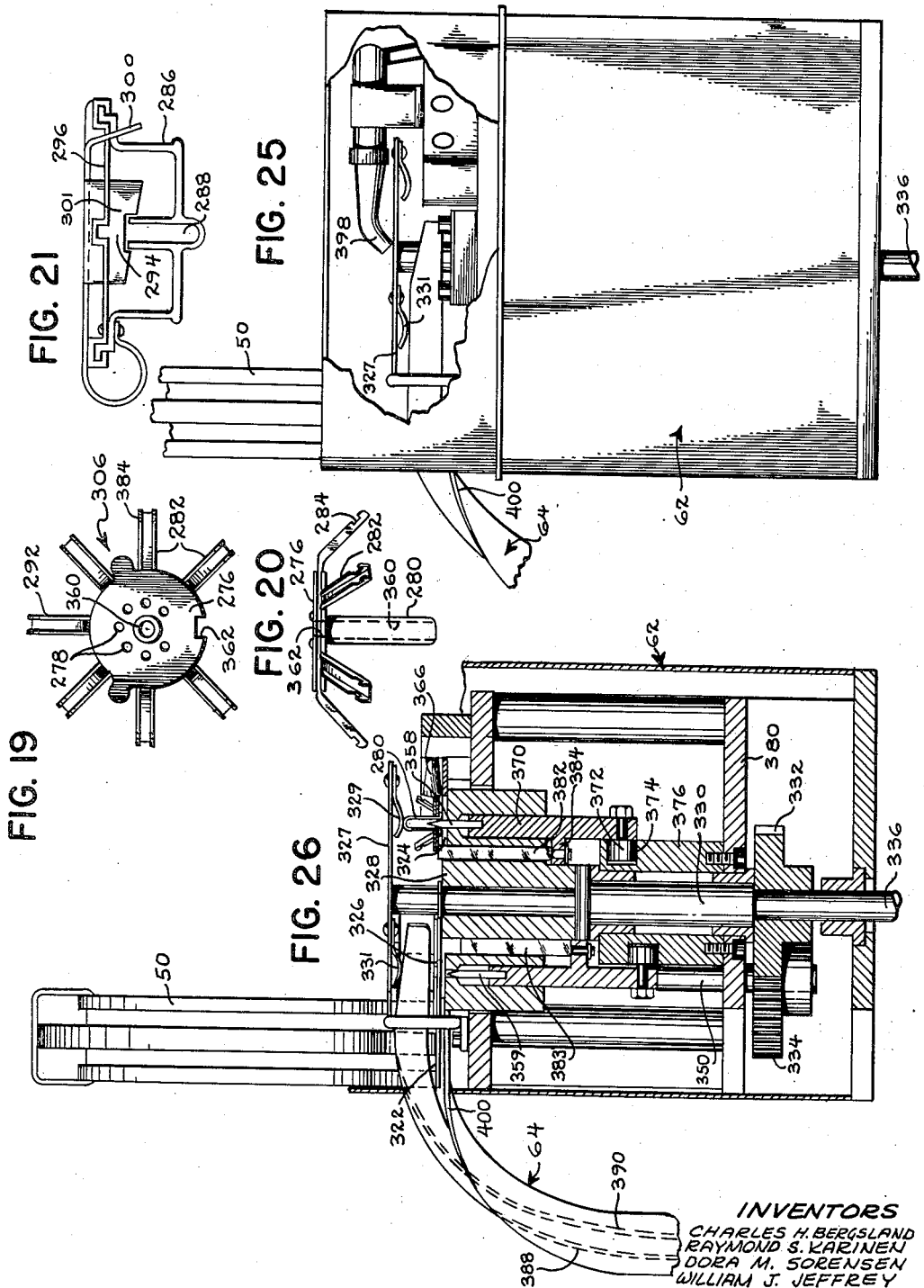

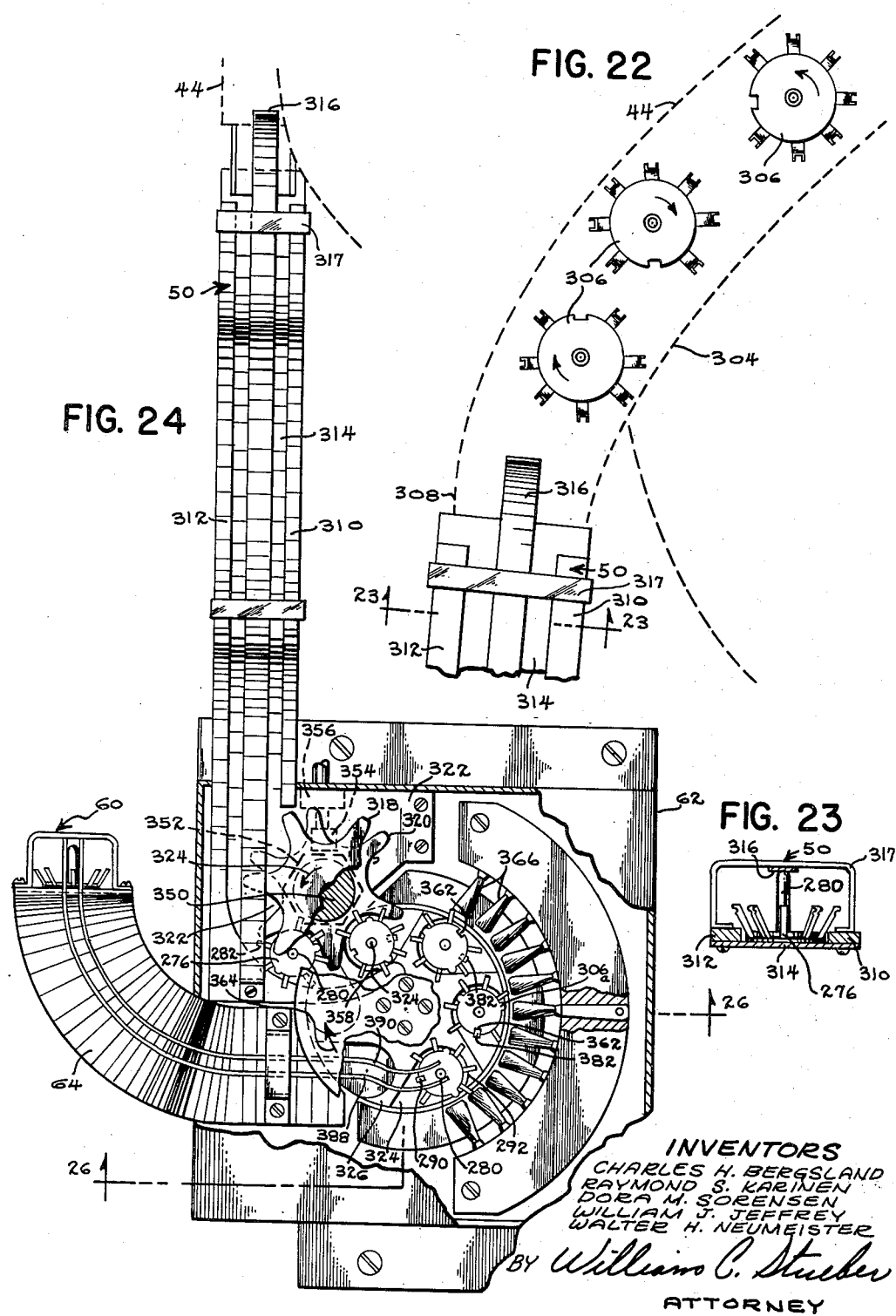

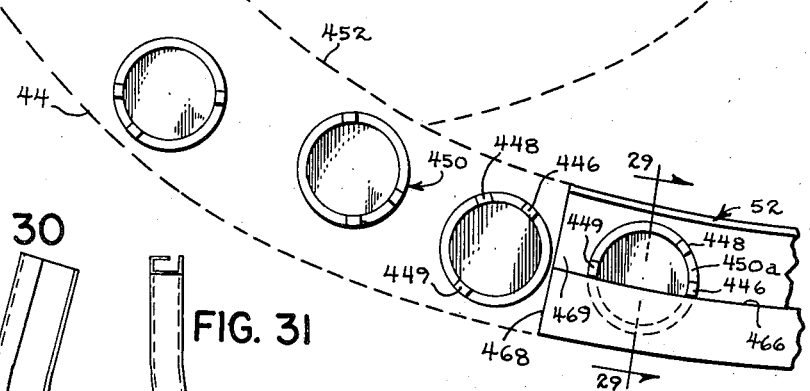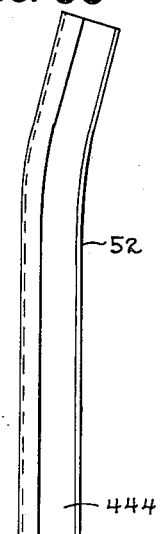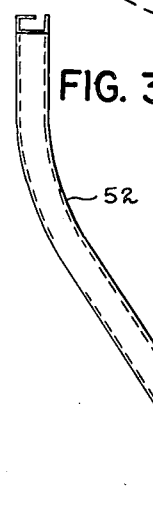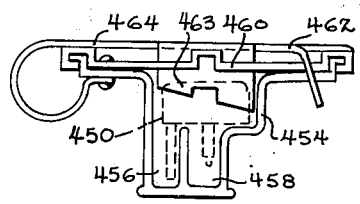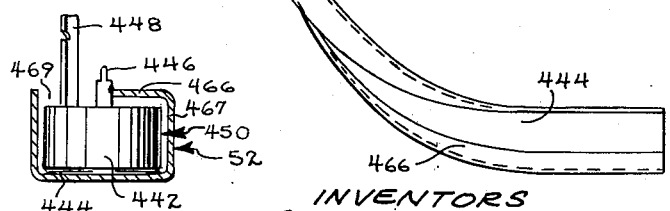

April 1, 1958 C. H. BERGSLAND ET AL 2,828,592
COMPONENT PREPARATION MACHINE
Filed Oct. 21, 1955 11 Sheets-Sheet 10
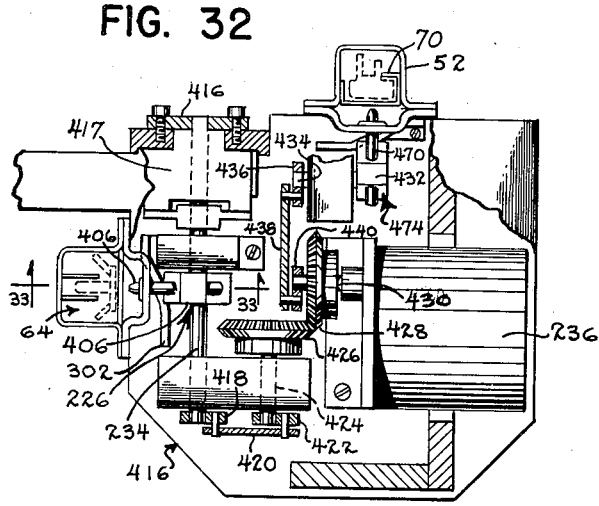
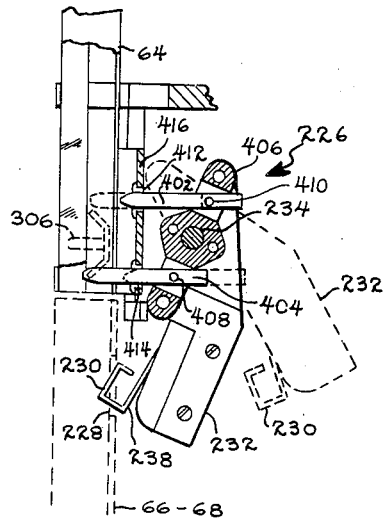
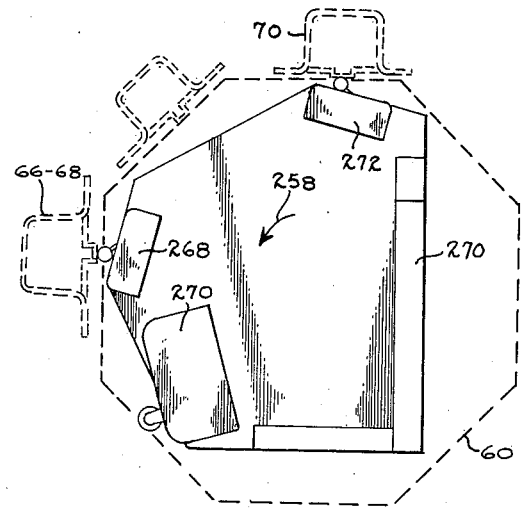
INVENTORS
CHARLES H. BERGSLAND
RAYMOND S. KARINEN
DORA M. SORENSEN
WILLIAM J. JEFFREY
WALTER H. NEUMEISTER
BY William C. Stueber
ATTORNEY April 1, 1958

C. H. BERGSLAND ET AL 2,828,592

COMPONENT PREPARATION MACHINE

Filed Oct. 21, 1955

INVENTORS
CHARLES H. BERGSLAND
RAYMOND S. KARINEN
DORA M. SORENSEN
WILLIAM J. JEFFREY
WALTER H. NEUMEISTER

BY William C. Strueber
ATTORNEY

United States Patent Office 2,828,592
Patented Apr. 1, 1958

2,828,592

COMPONENT PREPARATION MACHINE

Charles H. Bergsland, Stillwater, Raymond S. Karinen, St. Paul, Dora M. Sorensen, Minneapolis, William J. Jeffrey, St. Paul, and Walter H. Neumeister, Minneapolis, Minn., assignors to General Mills, Inc., a corporation of Delaware Application October 21, 1955, Serial No. 541,894

42 Claims. (Cl. 53—74)

The present invention relates to an improved machine for separating and orienting individual electrical components and loading them into magazines.

In developments in the art of assembling electrical circuitry it has been possible to mechanically and automatically assemble electrical components to form a completed circuit. The methods for automatically completing the circuits include the use of printed circuit boards with components attached to the boards. The boards generally are formed of an insulating material with lines of conducting metal embedded in or printed on the surface and may be manufactured by varied known processes and may take various forms. Usually the conducting lines on the circuit board terminate at a point where the electrical component is to be attached to continue the circuit to another conducting line. Frequently the circuit board is provided with holes at the end of the conducting area and the leads of the electrical components are inserted into these holes and soldered to the conducting lines.

When the circuits are assembled by automatic machinery, the circuit boards are mechanically fed to the machine and the electrical components attached to the boards by automatic attaching equipment. In order that the machine be continuous in operation, it is necessary to provide a continuous supply of components to the machine which needs the components for attachment to the circuit boards. The supply is frequently achieved by providing component magazines which are filled with a stack of electrical components and individual components are drawn from the magazine as they are needed.

A subsequent step in making the machines for assembling electrical circuitry completely automatic is to provide mechanism which will automatically orient electrical components and load them into magazines. This step is important in saving time and expense since the components are difficult to handle manually and much time and effort are consumed if the magazines must be loaded by an operator placing individual components on top of one another into the magazines. Components such as resistors, capacitors, tube sockets, and the like are small and difficult to handle, usually having leads and other elements projecting from the body of the component which makes them entangle themselves and it is difficult for an operator to separate them from a group and fill them into a magazine at a rapid pace.

It is accordingly an object of the invention to provide an improved machine which will receive electrical components in a disassembled group and which will rapidly and automatically separate and orient the components and load them into a magazine so that all the operator need do is supply the components and remove the filled magazine from the machine.

Another object of the invention is to provide a single machine which is capable of handling various types of electrical components and will load them into a magazine. More specifically, the machine will handle disc capacitors, tube sockets, and variable resistors, or will handle components having the same size and shape as these components and which will utilize common operating parts for the handling of each of these various components.

Another object of the invention is to provide a machine which will receive a group of disc capacitors and will separate, orient, and load the individual disc capacitors into a magazine without bending the leads or damaging the capacitor.

A more specific object is to provide a mechanism for separating individual disc capacitors as they are dropped freely from the end of a chute.

Another more specific object is to provide an improved machine which will orient individual disc capacitors which have been separated from a group so that the leads of the individual capacitors will all extend in the same direction.

Another object of the invention is to provide a mechanism which is capable of loading disc capacitors into a magazine by elevating up into the lower end of the magazine which is held in an inverted position.

A further object of the invention is to provide an improved sensing mechanism which will indicate when the magazine is filled and will automatically function to move a new magazine into loading position.

Another object is to provide a single sensing mechanism which will function to detect when a magazine is filled whether the machine be operated to load the magazine from the bottom or from the top.

A still further object is to provide a machine for filling magazines which will automatically move a fresh magazine into position when a magazine becomes full and will signal for the removal of the full magazine and will prevent continued operation and damage to the machine if the full magazine is not removed after a specific period of time.

Another primary object of the invention is to provide a machine which will receive free tube sockets and will separate and orient the sockets and automatically load them into a socket supply magazine.

Another object is to provide an improved tube socket orienting machine which will rotate successive sockets until the pins of each are in the same relative position and will maintain the sockets in their proper orientation until loaded into a magazine.

Another prime objective of the invention is to provide a machine which is capable of receiving variable resistors and separating and orienting the resistors and automatically loading them into a magazine.

A general object of the invention is to provide a simplified rugged machine which utilizes various common parts and operating members for handling a plurality of different types of electrical components so that the size and cost of the machine can be substantially reduced.

Other objects and advantages will become more apparent in the following specification taken in connection with the appended drawings in which:

Figure 1 is a side elevational view of the over-all machine with certain parts removed or broken away for clarity;

Fig. 2 is a front elevational view of the machine in the same scale as Fig. 1;

Fig. 3 is a plan view of the over-all machine to be viewed in combination with Figs. 1 and 2;

Fig. 4 is an elevational view of a disc capacitor of the type to be handled by the present machine;

Fig. 5 is a front elevational view of a magazine of the type to be loaded with disc capacitors;

Fig. 6 is a plan view of the magazine of Fig. 5;

Fig. 7 is a plan view of the hopper for feeding disc capacitors illustrating the manner in which the capacitors are fed;

Fig. 8 is an enlarged plan view of the mechanism for separating the capacitors after they slide down the upper chute;

Fig. 9 is a sectional view taken along 9—9 of Fig. 8 to illustrate the constructional details of the disc capacitor separating mechanism;

Fig. 10 is a plan view of the lower chute for delivering the disc capacitors from the separating mechanism to the magazine loading mechanism;

Fig. 11 is a side elevational view of the chute of Fig. 10;

Figure 35:
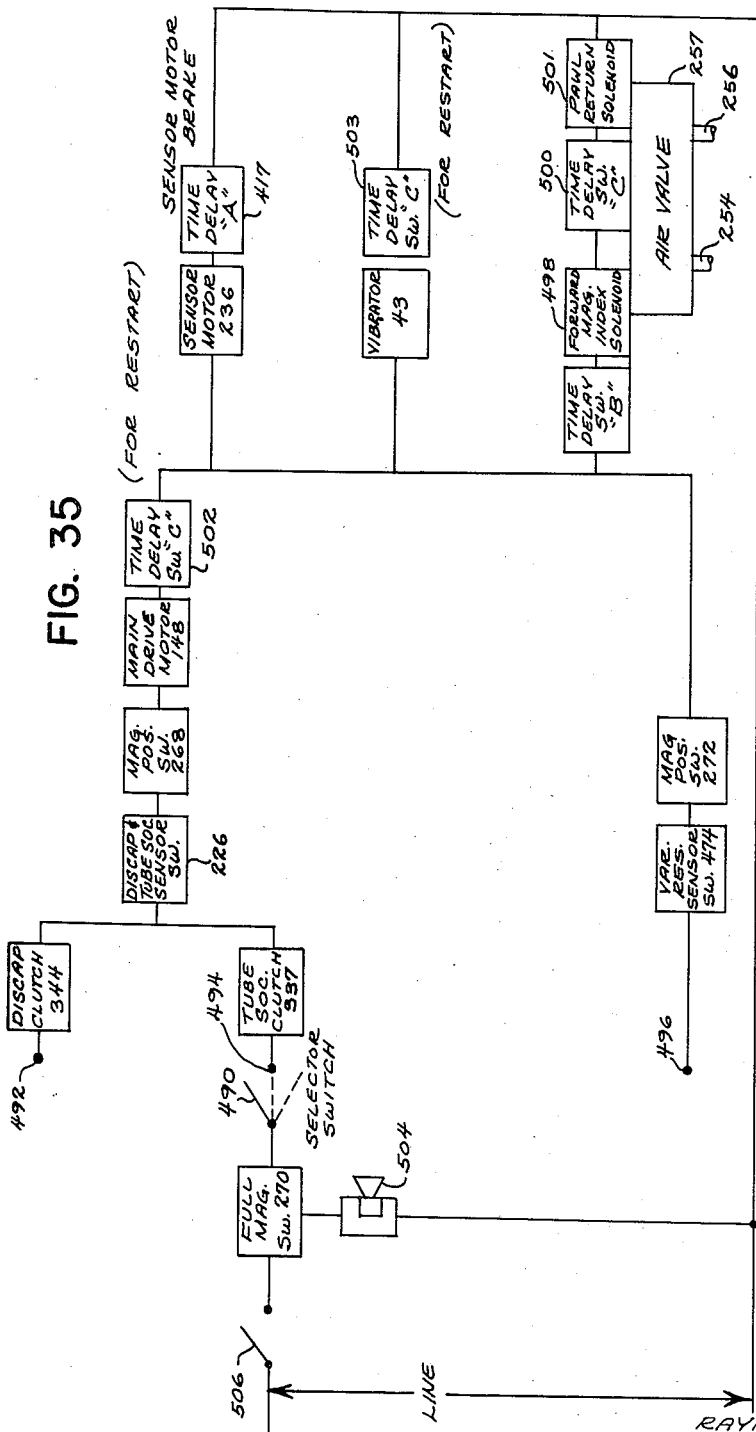

Figs. 12, 13, and 14 are a series of sectional views taken through the magazine of Fig. 11 to illustrate its cross sectional configuration at various positions along the chute;

Fig. 15 is a sectional view taken along line 15—15 of Fig. 16 illustrating the constructional details of the magazine indexing mechanism;

Fig. 16 is a sectional view taken along line 16—16 of Fig. 2 illustrating the relative position of the magazine indexing mechanism and the mechanism for loading capacitors into the magazine;

Fig. 17 is a sectional view taken along line 17—17 of Fig. 16 and illustrating the constructional details of the elevator for loading individual capacitors into the magazine;

Fig. 18 is a perspective view of the apparatus for insuring that the leads of the capacitor will be properly oriented as it is lifted up into the magazine;

Figs. 19 and 20 are plan and side elevational views of a tube socket of the type which can be handled by the present machine;

Fig. 21 is a plan view of the magazine into which the tube sockets are loaded;

Fig. 22 is a plan view of the delivery spout of the hopper for delivering tube sockets;

Fig. 23 is a sectional view taken along line 23—23 of Fig. 22;

Fig. 24 is a plan view of the mechanism for orienting tube sockets with the view showing portions of the mechanism broken away to better observe the relationship of the parts;

Fig. 25 is a side elevational view of the mechanism for orienting the tube sockets and illustrating the apparatus which controls the delivery of the sockets from the orienting machine;

Fig. 26 is another view of Fig. 25 but taken in vertical section to more clearly show the operating mechanism;

Fig. 27 is a plan view of the magazine which is to be loaded with variable resistors;

Fig. 28 is a plan view of the delivery portion of the hopper for feeding variable resistors, illustrating the construction of the mechanism for orienting the resistors;

Fig. 29 is a sectional view taken along line 29—29 of Fig. 28;

Figs. 30 and 31 are side and front elevational views, respectively, of the chute for feeding the variable resistors downwardly to the magazines;

Fig. 32 is a horizontal sectional view taken through the sensors and sensor operating mechanisms which detect when the magazines are filled;

Fig. 33 is a sectional view along line 33—33 of Fig. 32 illustrating the sensor mechanism which functions to determine when the magazines are filled and operates to drop tube sockets or variable resistors down into the magazine;

Fig. 34 is a plan view of the magazine supporting turret illustrating the positions of the magazines and of the magazine sensing switches; and Fig. 35 is a schematic diagram of control wiring of the machine.

The complete machine is illustrated in Figs. 1, 2, and 3 with the various operating mechanisms enclosed in their housings. These mechanisms will be described in detail in connection with the latter figures.

In utilizing the machine, the operator supplies free components to the machine usually by dumping them into the hopper and positions empty magazines on the machine. When the magazines become full, the operator removes them to either store them or take them to an assembly machine which removes the components from the magazine as it attaches them to circuit boards.

The machine is shown in Figs. 1, 2, and 3 supported from a main framework shown generally at 40. The framework has opposed side plates 41 and 42 as illustrated in Figs. 2 and 3 and braces extend across from between the plates to support the operating mechanism. During operation the operator dumps the loose components into a hopper shown by the dotted line outline 44 which rests on a hopper actuating mechanism such as a vibrator 43. The framework is provided with a cross step 46 which the operator mounts in order to be able to reach the hopper for dumping the components therein.

The hopper 44 and the vibrator 43 are shown in dotted lines because either the hopper or the hopper and vibrator as a unit are interchangeable with other hoppers in accordance with the type of component which is to be handled. Each of the hoppers for the different components is adapted to feed a particular type of component and, if only the hopper and not the vibrator is changed the hoppers are so shaped as to interchangeably fit on top of the vibrator. Each of the hoppers are operated in the same manner by the vibrator but have a discharge spout which fits a different chute provided for the particular component being handled.

Therefore, in the machine illustrated which is adapted to handle three different types of components—the disc capacitor, the tube socket, and the variable resistor—three chutes are provided with the chute 48 being provided for the disc capacitors, chute 50 being provided for the tube sockets, and chute 52 being provided for variable resistors.

When the machine is to handle disc capacitors, a hopper is selected which is adapted by size and shape to feed disc capacitors when vibrated by the vibrator 43 and the hopper is placed in position so that its discharge will be positioned directly over the chute 48 which is provided for disc capacitors. A connection may be provided between the upper end of the chute and the hopper so that the two may be firmly connected to each other.

Generally, it is preferred that the entire machine be operated no matter which type of component is being loaded into the magazines since many of the operating elements perform functions common to several of the types of components. Separate clutch or switch means are provided to turn off certain sections of the machine that are not used.

When the machine is operating with disc capacitors, a hopper 44 is placed in position to discharge the capacitors in the upper capacitor chute 48. The disc capacitors feed from the hopper as it vibrates and drop into the upper chute from which they enter a mechanism for separating the individual capacitors, and this mechanism is shown generally at 54. After the unit capacitors are separated, they pass down a lower orienting chute 56 changing their position so that they will enter loading capacitor mechanism 58 with the leads projecting forward. The loading mechanism elevates the individual capacitors and pushes them into the bottom of a disc capacitor magazine, shown by the dotted line magazine 66, Fig. 1, which is supported by the magazine turret 60. The magazine turret holds the magazine in filling position until it is filled and then indexes a fresh magazine into position.

If the mechanism is to be operated with tube sockets, the disc capacitor hopper is removed and a tube socket hopper placed on the vibrator 43. This tube socket will have its discharge spout aligned with the upper tube socket chute shown at 50. This chute 50 leads down into a tube socket orienting mechanism 62. In the orienting mechanism, the tube sockets are rotated about their axis to the proper position so that the pins of each succeeding socket will be in the same relative position. The sockets are then fed downwardly through a lower tube socket chute 64 which leads to the tube socket magazine shown in dotted line position 68 in Fig. 1, this position being the same as the position 66 of the disc capacitor magazine when it is being filled. The tube socket magazine at 68 is supported on the magazine turret 60 which functions to support all of the magazines and to index a new magazine into place as the magazines become filled.

If the mechanism is to be used for filling magazines with variable resistors, a hopper 44 that is adapted to conveying resistors is placed on the vibrator 43. All the hoppers may be similar in size and shape except that their design is such that they will accommodate one type of component better than another. The hoppers are usually furnished with a spiral rail attached to the inside of the wall of the hopper and the spiral rails lead upwardly from the floor of the hopper to a discharge spout or opening.

As the variable resistors leave the hopper they are oriented by a specially shaped orienting spout. The resistors are then passed down the chute 52 to be delivered to the variable resistor magazine shown in the dotted line position 70, Fig. 1. This magazine is also supported from the magazine turret 60.

Thus the magazine loading machine is easily and readily adaptable to handling any one of the three types of components given as illustrations. Various other types of components of course may be handled by the mechanism, provided the components have a size and shape similar to the components described or with minor changes in mechanism components of varying shapes can also be handled.

For purposes of clarity the detailed description of the elements of the machine will be divided into sections corresponding to the type of component that the machine is handling. The details of the mechanism for handling disc capacitors will first be described and the mechanism for handling tube sockets and variable resistors will be thereafter described.

*Disc capacitor magazine loader*

A disc capacitor of the type to be loaded into the magazine is shown in Fig. 4. The capacitor has a flat disc-like body 72 with a pair of parallel leads 74 projecting from the edge of the capacitor. These capacitors commonly are quite small and therefore are difficult to handle either mechanically or manually. The capacitors also are fragile and can not be handled roughly.

The magazine which is to be loaded is illustrated in Figs. 5 and 6 and is shown generally at 66. The magazine has a body portion 78 shaped so that the capacitors can be stacked in a horizontal position and the body opening in the magazine is cylindrical in shape with a pair of channels 218 extending outwardly from the openings to hold the leads of the capacitors. With the magazine thus shaped, the capacitors will be stacked one on top of each other in a horizontal position and will remain in their oriented position to be fed to a capacitor attaching machine.

At the base of the magazine is a spring retainer 80 which has a central gate portion 81 projecting beneath the stack of capacitors so as to prevent them from falling out of the magazine while it is being handled. This spring retainer arm 80 must be deflected out of the way in order that capacitors may be loaded into the magazine. To accomplish this, the spring retainer arm 80 has a bent end 83 which is forced out of the way by a cam 85 shown in Fig. 16 which engages the end 83 when the magazine is moved into filling position.

The magazine, Fig. 5, has a pair of brackets 82 and 84 which project outwardly away from the magazine to slide over supporting brackets 86 and 88, Figs. 1 and 2, which support the magazines. These supporting brackets 86 and 88 are secured to the edge of flanges 90 and 92 which project outwardly from the drum 94 which is part of the magazine supporting turret indicated generally at 60.

The drum 94 is removable from its support for replacing with other drums which have magazine supporting brackets of different size and spacing. The drum construction is shown in detail in Fig. 15 where the drum 94 is provided with a lower annular flange 96. Secured to the flange is an indexing ratchet 100 which is connected thereto by bolts 98. The indexing ratchet is constructed to have a downwardly extending annular flange 99 which rotatably seats on casting 101 to rotate thereon. The drum thus can be easily lifted off the casting 101 for changing turrets. The casting 101 is secured to the top surface of plate 180 which is also shown in Fig. 16. The operation of the indexing gear 100 in rotating the turret to bring a fresh magazine into position will later be described in connection with Fig. 16.

Thus the magazine at 66 is supported on the brackets 86 and 88, with other magazines being supported on the remaining brackets such as 102 and 104 and these other magazines are successively moved into the loading position of magazines 66 or 68. The magazine 66 is loaded from the bottom by the capacitors being lifted up through the open bottom end and retained in place once they have entered the magazine. The magazine 68 is loaded from the top by tube sockets being dropped into the top.

To feed the individual capacitors from the hopper 44 where they are first placed in their loose state the hopper is vibrated and the capacitors climb the inclined rail 106 as is illustrated in Fig. 7. The inclined rail extends spirally upward from the bottom of the hopper and the capacitors climb the rail when the vibrator 43 operates. The individual capacitors, as shown at 108, are not aligned and move outwardly through a discharge spout 110 to drop down into the upper chute 48.

With reference to Fig. 2, the chute 48 has a zigzag shape at 112 to slow down the descent of the disc capacitors. Since the discharge end of the chute is substantially vertically directly below the receiving end without the speed-deterring zigzag, the capacitors would drop much too fast and might smash at the bottom when they are discharged from the chute 48.

The lower end of the chute 48 deposits on a plate 114 shown in Figs. 1, 2, 8, and 9. Plate 114 is shown in detail in Figs. 8 and 9. The plate is provided with pockets or notches 116 into which the capacitors 72 are caught and carried forward as the plate rotates.

The pockets are sufficiently large to hold the capacitors lying flat in any rotational position as shown by the capacitors 118 which rest in the pockets 116 in Figure 8. The chute 48 deposits the capacitors in the position of the capacitors 118. However, some capacitors do not slide into the pockets 116 and these stay on the upper surfaces of the plate 114. As the plate 114 rotates forwardly in the direction of the arrow 122, the individual capacitors are either caught in the pockets and are moved forward or if the capacitor does not seat within the pocket, it is brushed aside by the curved fence 124. The fence curves outwardly away from the center 140 of the plate 114. If a capacitor is not set in the pocket, it will be brushed aside by the fence 124 and dropped into the overflow hopper 128 as shown in Fig. 8. The overflow hopper is periodically emptied by dumping the loose capacitors back into the supply hopper 44. The fence 124 is secured to the edge of the stationary plate 126 which is positioned above the rotating plate 114.

Once the capacitors are caught in the pockets 116 they are held by the flange 146 which extends annularly around the rotating plate 114. The capacitors which are caught in the pockets 116 are carried forward beneath the curved fence 124 and travel around with the plate 114 until they are beneath the rotating brush 130, shown in Figs. 8 and 9. The brush engages the upper surfaces of the capacitors and sweeps them out of the pockets into the lower orienting chute 56 as illustrated in Figs. 1 and 2.

The brush 130 is formed of a cylindrical hub 132, Figs. 1, 8, and 9, carried on a rotating shaft 134. Bristles such as 136 and 138 project from the outer surface of the hub 132 to engage the capacitors and as the hub rotates in timed relationship to the rotation of plate 114 a set of bristles will engage each capacitor.

Thus as the plate 114 rotates, the individual capacitors drop onto the plate and are either caught in the notches of the plate or are swept off into the overflow hopper 128. Those which are caught in the notches are therefore separated from each other and are swept off the plate into the lower chute. This operation has served to separate the individual capacitors in order that they may be individually delivered to the lower chute which orients them and delivers them in timed sequence to the magazine loader.

The rotating plate 114, Fig. 9, is carried on a vertical shaft 140. The shaft is journaled in a lower plate 142, Fig. 9, and in an upper casting 144. The casting 144 has the upstanding peripheral flange 146 which extends upwardly so that its upper edge is at substantially the same height as the rotating plate 114, and this edge holds the capacitors in the pockets as the plate rotates.

The shaft 140 is driven from a drive motor 148 as is shown in Figs. 1 and 2 and this motor drives the majority of the operating elements of the machine. The motor drives shaft 141 through a gear reduction and a clutch 344 connects shaft 141 to shaft 140.

As shown in Fig. 9, the drive shaft 140 carries a gear 150 driving a mating gear 152. The mating gear is carried at the lower end of a shaft 156 which carries at its upper end a bevel gear 158 which meshes with another bevel gear 160 carried at the end of the shaft 134 which carries the brushes. The gearing from the drive shaft 140 to the bevel gears 158 and 160 is designed to cause the brushes to rotate in synchronism with the plate 114 to bring a group of bristles across each pocket 116 to sweep the disc capacitors from the pockets. The spacing of the individual bristles such as 136 and 138 is such that a brush will sweep over a pocket as the pocket is brought beneath the brush assembly.

After the capacitor is brushed off of the rotating plate 114 by the brush assembly 130, it drops into the lower chute 56 which is illustrated in detail in Figs. 10 and 14.

The upper end 162 of the lower chute 56 is broad and V-shaped to catch the component shown at position 163 of Figs. 10 and 11. At the side of the V-shaped portion are ears 164 and 166 which have holes drilled in them for attaching the chute at its upper end to the frame of the separating mechanism 54. As the capacitor slides downwardly on the chute 56, the V-shaped portion narrows and leads to a narrow U-shaped portion as shown in Fig. 13. The cross sectional shape of the V-shaped portion is shown in Fig. 13 and this shape functions to turn the capacitor so that its body lies in a substantially vertical plane. Since the capacitors are horizontal when they are kicked off the rotating plate by the brushes, they may land on the upper end of the chute in varying positions but will slide with their edge down in the V-shaped groove. With the edge thus in the base of the groove, the V-shaped portion of the chute narrows to the U-shaped section which has vertical walls and is slightly wider than the thickness of the body of the capacitor. In this section the capacitor in the position 165 will begin to roll about a horizontal axis since it will rest against its lower peripheral edge which will make frictional contact with the base 170 of the chute. As the capacitor rolls, it rotates forward until the leads 173, as shown in the dotted line position 172 of the capacitor in Fig. 14, are in the forward position so that they engage the base 170 of the chute and prevent the capacitor from rotating any further. At this location, the top of the chute is closed as shown at 174 in Figs. 10 and 11. This prevents the capacitor from accidentally tumbling end over end and keeps the leads 74 in the foremost position.

The chute then twists through 90° as shown at 176 to turn the capacitors from a vertical position to a horizontal position where they rest on their sides. The capacitors are thus delivered from the chute in their horizontal position as shown at 178.

The chute passes downwardly through a plate 180 as shown in Fig. 16 to deliver the capacitors to an elevator shown generally at 182 in Fig. 17 and this mechanism functions to lift the individual capacitors up into the magazines.

The capacitor comes to rest at the end of the chute in the position shown at 184 in Figs. 16 and 17. In this position it rests in the cylindrical bore 186 in the block 192 on top of the elevator plunger 188. Above the bore 186, in which the capacitor rests, are three spring fingers 190 extending radially into the sides of the bore 186. The spring fingers are secured at the edges of the bored block 192, in which the elevator plunger 188 slides, such as by screws 194. The spring fingers 190 slant upwardly so that as the plunger 188 lifts they will permit the capacitor 184 to pass upwardly but will snap behind the capacitor to prevent it from again dropping down.

Thus as the capacitor comes to rest above the plunger in the position shown in Fig. 17, the elevator will move upwardly to force the capacitor past the holding springs 190 and up into the magazine which is positioned above the opening 186. The elevator 188 will then again move downwardly and the springs 190 will prevent the capacitor from following the plunger.

The springs 190 will of course support the entire stack of capacitors within the magazine and the loading action for the individual capacitors will be repeated until the magazine is filled with capacitors as detected by a sensing mechanism such as shown in Fig. 33.

For moving the plunger up and down to elevate the individual capacitors, it is attached to a link 196, Fig. 17. The link is rotatably secured to a crank 198 which is mounted on a rotating crank shaft 200 supported in bearings 202.

With reference to Figs. 1, 2, 4, and 17, it will be seen that the crank shaft 200 is driven by a pulley 204 which carries a V-shaped belt 206. The V belt passes over an upper pulley 208 which is carried at the end of the shaft 134, this being the shaft which drives the brushes 130 which sweep the separated components off the rotatable plate 114. Thus the elevator is moved in synchronism with the brushes and elevator each time a capacitor slides down the chute 56.

The elevator 188 as shown in Fig. 17 may encounter an obstacle in its ascending motion due to the magazine being filled or the individual components being jammed. To prevent damaging the components a spring release is provided in the linkage between the crank and the elevator. For this purpose the elevator is hollow and a push rod 210 is inserted into the hollow elevator. The base 212 of the push rod is bifurcated and pinned to the link 196 which connects to the crank arm 198. A compression spring 214 extends between the enlarged base 212 of the push rod and the bottom face of the elevator to urge the two to their extended positions. To prevent these elements from separating, the elevator 188 has a slot 216 and a pin 219 secured to the push rod extends laterally from the top end of the push rod 210 into the slot. This pin prevents the push rod and elevator from separating due to the action of the spring 214 but yet permits the push rod to telescope into the plunger in case the elevator plunger meets any resistance in its ascending motion. When the push rod moves into the elevator plunger the pin 219 will slide upwardly in the slot 216.

Although the capacitors have been oriented by the chute 56 illustrated in Figs. 10 and 11 and are delivered in a horizontal position with their leads 185 extending forwardly as illustrated in Figs. 16 and 17, an additional straightening device is provided to insure that the capacitor will be accurately oriented so that the leads 74 will properly enter the slots 218 in the magazine as illustrated in Fig. 6. To insure this orientation a straightening plate 220 is provided as illustrated in Fig. 16 and as shown in detail in Fig. 18. This plate has a raised central portion 222 which tapers to a point 224 at its lower end which passes between the leads 185 of the capacitor 184. As will be seen in Fig. 18 as the plunger 188 rises, the individual leads 185 will pass on either side of the point 224 of the straightening plate. In the upper part of the raised portion 222 of the plate, the width of the raised portion approaches the width of the separation of the leads so that they are positively oriented and in this position they will be raised above the plate into the magazine to pass accurately into the slots 218 of the magazine.

The magazines, as previously described, are supported from the magazine turret 60 as shown in Figs. 1 and 2 and the disc capacitor magazine 66 is supported in the dotted line position shown in Fig. 1. At the top of the magazine is a sensor device 226 shown in position in Fig. 2 and shown in detail in Figs. 32 and 33. The sensor device illustrated functions to operate for both magazines 66 and 68 which are for disc capacitors and tube sockets, respectively. Thus if the machine is operating on tube sockets, the same sensor operates as if the machine is operating on disc capacitors. The upper ends of the magazines 66 and 68 are provided with an opening 228, Figs. 1 and 33, into which the feeler 230 of the sensor switch 232 extends.

The sensor switch is mounted on a pivotal support shaft 234 and pivots back and forth about this axis. The support shaft 234 as illustrated in Fig. 32 is driven through driving mechanism from a motor 236 and this mechanism will be described in detail later in connection with the tube socket magazine loading mechanism.

As the magazine 66 or 68, as shown in Fig. 33, fills with capacitors, the capacitors will rise to the point where they will be engaged by the feeler 230 when the switch is in the position shown in Fig. 33. This will depress the switch plunger 238 which will activate a circuit to temporarily stop the sensor switch from swinging and to index the magazine supporting turret to take the filled magazine to a delivery position and to rotate a fresh magazine into position for filling. The motor 236 which drives the pivotal operation of the sensor switch is operated by a circuit controlled by the sensor switch 232 so that when the sensor switch is closed a delay mechanism will be initiated which permits the sensor switch to swing to the out-of-the-way position before stopping. When the fresh magazine has been moved into filling position by the magazine turret the motor 236 will again be started, whereupon the sensor switch 232 will again begin its pivotal motion which continues until the magazine is filled. The circuit diagram associated with the sensor switches is shown in Fig. 35 and will be described later.

As was described in connection with Fig. 15, the magazine turret assembly 60 comprises a drum 94 which rests on top of a casting 101 and which is rotated by the toothed ratchet 100. The ratchet wheel 100 is shown in Fig. 16 as being provided with teeth 238 which are engaged by an indexing pawl 240. The pawl is pivotally carried at the end of a rocker arm 242, and a leaf spring 244 secured to the end of the rocker arm holds the pawl in engagement with the teeth 238 of the ratchet 100.

The rocker arm is pivotally mounted at 246 and is operated by a pneumatic cylinder 248. The cylinder contains a piston having a rod 250 which is connected at 252 to the end of the rocker arm. Air lines 254 and 256 supply air to the cylinder to operate the piston rod and thereby index the ratchet wheel.

When the sensor mechanism of Fig. 33 indicates that the magazine is full, the switch 232 will operate a solenoid valve which controls the supply of air to the lines 254 and 256. The valve will first feed air to line 254 venting line 256 to pivot the rocker arm 242 in a clockwise direction which will cause the pawl 240 to engage a succeeding tooth in the ratchet. The air valve will then automatically feed air to line 254 venting line 256 to pivot the rocker arm 242 back to the position shown in Fig. 16. This will, of course, rotate the magazine turret counter-clockwise in the direction shown by the arrow 258 bringing a new magazine into filling position. The teeth on the ratchet wheel 238 are spaced the same as the spacing of the magazines on the turret so that a new magazine will be brought into position for each indexing motion.

Small adjustments in the position of the magazine can be effected by the adjusting screw 260 which is adjustably supported on a bracket 262. If this screw is turned inwardly against the pawl, the magazine turret will be caused to rotate slightly in the direction of the arrow 258 because only the tip of the pawl bears against the ratchet wheel and this contact position creates a force against the ratchet wheel which acts through the turret at one side of the rotational center of the turret.

A spring leaf 264 supported from a bracket 266 is provided to steady the rotation of the turret and to prevent any backtravel. This spring is biased against the teeth of the ratchet wheel and snaps behind the tooth when the ratchet wheel reaches its final stopping position. The spring also bears against the flat surface of the teeth to steady the ratchet wheel in its stopped position.

Thus each time a magazine becomes full, the sensor mechanism will cause operation of the ratchet indexing mechanism and a new magazine will be moved into filling position. When this occurs the sensor of Fig. 33 will again start swinging to operate to detect when the new magazine is filled. The operation of the main drive motor 148 will have been temporarily halted while a new magazine is being moved into position to stop the operation of the elevator. The operation of the sensor motor 236, the main drive motor 148 and of the vibrator 43 are all controlled through the sensor switch 232 by suitably operated relays. This will be described in connection with Fig. 35 which schematically shows the wiring diagram.

As shown in Fig. 34 the magazine shown in the dotted line position 66—68 is in the filling position. A microswitch is placed at this location to be closed by the magazine only when it is in the proper filling position. It is necessary that this microswitch be closed in order that the machine again start after a filled magazine has been moved out of filling position. This will prevent the machine from beginning operation with an improperly positioned magazine which could cause the machine to damage itself or will prevent operation of the machine with no magazine in place.

As the turret indexes in the direction of the arrow 258 in Fig. 34, after the magazine is filled, the magazine will be moved to a position opposite the microswitch 270. This microswitch is connected in series with an audible or visible signal which will indicate to the operator that a filled magazine must be removed from the turret. In addition to signaling the operator, this microswitch is arranged to stop the operation of the machine when the magazine 66 is filled if the previously filled magazine has not been removed. Switch 270, of course, may be positioned at any location around the turret so that several filled magazines may accumulate before the operator is signaled and before the machine is stopped if the filled magazine is not removed.

It will be noted from Fig. 34 that another microswitch 272 is provided on the turret. This microswitch is in position to be closed by magazine 70 which is for the variable resistors. Switch 272 functions the same as switch 268, to insure that a magazine is present and properly located in the filling position. It will be recalled that the magazines in position 66—68 of Fig. 34 may be used for either the disc capacitor or the tube socket, whereas the magazine in position 70 is used for variable resistors. Switch 270 may be used to signal that a full magazine is in the position of the switch for either the variable resistor or the tube socket. If only the one switch 270 is provided, the turret supporting the magazine will have to be indexed through a number of stations and variable resistors will fill all the spaces up to the switch 270 before it will be actuated. It is, of course, possible to provide an additional switch like 270 which is located immediately after switch 272 so that a signal will be given when only one variable resistor magazine has been filled and is moved out of the filling position.

The switches 268, 270, and 272 are supported from a bracket arrangement 274 which is suitably connected to the framework of the machine. Various support arrangements may be used and the details of the connection to the main frame are therefore not illustrated.

*Tube socket magazine loader*

Tube sockets of the type which may be handled by the present machine are illustrated in Figs. 19 and 20. These sockets have a central wafer portion 276 which contains the holes 278 for the pins of the tube. Extending below the wafer portion is a centering spindle 280 which will project downwardly into a hole in a circuit board when the sockets are mounted thereon.

Projecting radially from the sides of the wafer are spring fingers 282 which have notches 284 in their ends. To mount the tube socket on a circuit board, the spring fingers are forced inwardly and inserted into holes in the circuit board. Their resiliency causes them to push outwardly to lock their notches 284 over the edge of the small holes in the board in which the fingers are inserted. These holes are located at the ends of the conductor strips on the circuit board and the fingers of the tube socket are soldered to the conductor strips. The fingers lead through the wafer, which is comprised of two insulating discs clamped together, to the tube pin holes 278 in the socket. Since the tube will be oriented on the socket because of the spacing of the holes 278, the socket must be properly oriented with respect to the circuit board when it is attached. Therefore the present machine orients the socket and loads it into the magazine in an oriented position so that no further rearrangement is necessary before handling by the assembling machine.

A magazine of the type loaded by the present machine is shown in Fig. 21. This magazine has a body 286 which is shaped in accordance with the cross section of the tube socket. A central slot 288 extends downwardly through the body and the centering spindle 280 and the tube socket finger 292 will slide in the slot 288 to keep the socket oriented. The wafer 276 of the tube socket will be positioned in the space 294. The remaining portion of the magazine includes a back 296 connected at its edges to the body portion 286. A spring leaf 300 is provided which carries a projection 301 to extend beneath the magazine to prevent the sockets from accidentally dropping out of the magazine during handling. With the exception of the shape of the magazine body, it will have substantially the same construction as the magazine shown in Fig. 5 which is adapted to handle disc capacitors.

The spring leaf 300 and the projection 301 which blocks the bottom of the magazine must be drawn out of the way when the magazine is to be loaded in its inverted position and for this purpose a cam 302 is provided, Fig. 32, which functions to push the spring 300 to the open position when the magazine is moved into loading position. It is to be noted that whereas the disc capacitors are mounted from the bottom of the magazine with the magazine in an upright position, the tube socket magazines are loaded from the top with the magazine in an inverted position. With reference to Figs. 1, 2, and 32, the magazine in loading position is located beneath the lower tube socket chute 64 and is supported on the magazine turret 60.

To change the machine from operation with disc capacitors to operation with tube sockets, the hopper 44 is changed and a tube socket hopper is placed on the vibrator. This tube socket hopper as shown in Fig. 22 has an inclined spiral ramp 304 which leads up from the bottom of the hopper and extends spirally upwardly along the hopper wall. During operation the ramp vibrates causing the sockets 306 to climb the ramp and pass out through a discharge spout 308. The spout leads to an upper tube socket chute 50 which is shown in section in Fig. 23. The chute has a pair of rails 310 and 312 on each side of the floor 314 of the chute to guide the wafer 276 of the tube socket. Another guide rail 316 extends along the top of the chute under which the spindle 280 of the tube socket slides to prevent the tube socket from tumbling end over end as it moves down the chute 50. The upper guide 316 is supported by an arched bracket 317 which is connected at its ends to the rails 310 and 312. The chute, as is pictured in Fig. 2, guides the sockets downwardly and then tapers to a horizontal slope to deliver the tube sockets to the tube socket orienting mechanism shown at 62.

This mechanism 62 for separating and orienting the tube sockets may be seen in Fig. 24 taken in connection with Figs. 25 and 26. As the tube socket enters the orienting machine 62, it slides into the teeth of a pair of vertically spaced star wheels 318 and 320. The sockets leave the chute 50 and enter the orienting machine 62 sliding on a flat surface plate 322, Figs. 24 and 26. The lower star wheel 320 slides on the surface of the surface plate 322 and is relatively thin so as to engage only the wafer 276 of the tube socket 306, Fig. 24. The upper star wheel 318 is spaced above the lower star wheel 320 a substantial distance so that it will clear the fingers 282 but engage the centering spindle 280. The star wheel rotates counterclockwise as indicated by the arrow 324. As the star wheel carries the individual sockets forward, they are transferred into pockets 324 in a rotating plate 326. The plate 326 and star wheels are rotated in synchronism so that a socket is always present when a pocket 324 is in position to receive the individual sockets.

Fig. 26 illustrates apparatus for driving the star wheels and the plate 316 having the pockets. The plate 326 is supported from a hub 328 which rotates with a shaft 336. The shaft carries a bearing sleeve 33. At its lower end is a driving gear 332 which drives gear 334 carried on the lower end of shaft 350 which carries on its upper end the star wheels 318 and 320 which are thus driven in synchronism with the plate 326.

With reference to Fig. 1, the shaft 336 is driven through a clutch 337 which is driven by a sprocket 338 driven by a chain 340. This chain is driven by a sprocket 342 which is carried on shaft 140 driven from the main drive motor 148. Clutches 344 and 346 are interposed in the shafts 140 and 336 for selective operation of these shafts. Thus, since shaft 140 operates the mechanism for separating and orienting the disc capacitors and shaft 336 operates the mechanism for separating and orienting the tube sockets, only one apparatus need be operated by selective engagement of the clutches 337 or 344.

As will be noted from Fig. 24, shaft 350 which rotates the star wheels 318 and 320 also carries a cam 352 operating a follower 354. This follower controls an air valve 356 to operate the air which discharges sockets from the separator mechanism of Figs. 24, 25, and 26 as will later be described.

When the tube sockets are firmly positioned in the pockets 324 of the rotating plate 326, a centering pin 358, Figs. 24 and 26, rises up to insert itself into the hollow spindle 280 of the tube socket. This centering pin holds the tube socket in a centered position in the pocket 324 and permits it to rotate about its vertical axis with respect to the pocket. The purpose of this rotation is to orient the tube socket.

Positioned above the plate 326 is a disc 327 carrying spring fingers such as 329 and 331 which press downwardly on the center spindles 286 of the tube socket. This holds the socket down on the pin 358 so that the socket will not be lifted up when the pin rises. The disc 327 is mounted on the top of the shaft 336 and rotates as the plate 326 rotates.

As will be noted from Figs. 19 and 20 which show the tube socket, the spindle 280 contains a hollow bore 360. The centering pin 358 of the machine inserts itself into this bore. The wafer 276 of the tube socket also contains a notch 362 which will control the amount of rotation which the tube socket receives while in the orienting mechanism.

As the plate 326 rotates in the direction of the arrow 364, the fingers of the tube sockets move past the stationary brushes 366 as shown in Figs. 24 and 26. This will rotate the tube sockets about the centering pin 358 and this rotation will continue until the sockets are properly oriented.

As will be noted in Fig. 26, the centering pins 358 about which the sockets are rotated are supported on plungers 370, Fig. 26. The plungers are slidably mounted for vertical reciprocation in vertical bores in the hub 328. The centering pins 358 are centered in the pockets 324 in the plate. The lower end of the plungers 370 carries follower rollers 372 which ride in the track 374 of a stationary barrel cam 376. This track is so shaped as to raise each of the plungers and the pins 358 after the tube socket becomes positioned in the pocket 324 of the plate and to lower the pin after the tube socket has become oriented and is ready to be discharged from the orienting mechanism. The pin 359 at the left hand side of Fig. 26 is in the lowered position and the pin 358 at the right is in the raised position. Therefore while the plate 326 and the plungers carrying the centering pins 358 rotate, the barrel cam 376 which is bolted to a frame plate 380 remains stationary to cause the centering pins 358 to move up and down.

Also carried on the plunger 370 is a socket orienting key 382. The orienting key 382 is connected to a bracket 384 on the plunger. As will be noted from Fig. 26 when the plunger ascends to project the centering pins 358 into the tube socket, the orienting key 382 will also rise above the lower surface of the pocket 324 in the plate 326. When the orienting key 382 rises, it will slightly elevate the tube socket, pushing it upwardly against the spring finger 329, as shown in Fig. 26. The tube socket will remain elevated until it has been rotated to a position where the notch 362 in the socket is located over the orienting key 384 and at that point the socket will drop over the orienting key and be locked thereby Thus the stationary brushes 366 will rotate the sockets as they are carried past the brushes in a counterclockwise direction as shown in Fig. 24 and the sockets will rotate until the notch 362 drops over the orienting key 382. By the time the sockets reach the position illustrated by socket 306a, Fig. 24, they will have been rotated sufficiently to align the notch with the orienting key. The plate 326 continues to carry the sockets forward into the guide rails 388 and 390. These guide rails are elevated as shown in Fig. 26 to permit the wafer of the tube socket to slide beneath them but the spindle 280 of the tube socket and the tube socket finger 292 slide between the guide rails.

At this point the barrel cam 376 permits the centering pin 359 and the orienting key 383 to be dropped to free the tube socket. The guide rails 388 and 390 lead away from the rotating plate 326 to guide the tube sockets out of the pockets 324. To aid the discharge of the tube sockets from the pockets of the plate an air jet 398 is provided, Fig. 25. This air jet is aimed at the back of the tube sockets and is intermittently actuated to force the tube sockets out of the pockets when they are in the proper position.

As was previously discussed, this air jet is operated by a follower plunger 354 which engages the cam 352 as shown in Fig. 24. The air jet operates once each time a tube socket is brought into discharge position in the guide rails 388 and 390 and as the air jet operates, as may be seen in Fig. 25, the tube socket is shot out of the pocket in the plate and slides down the lower chute 64. The lower chute 64 has a floor 400 which supports the base of the tube socket, and the guide rails 388 and 390 continue for the extent of the chute to keep the socket in its oriented position.

At the lower end of the lower chute 64 the sockets reach the separating mechanism which is operated with the sensor 226 shown in Fig. 33. As the tube sockets 306 slide down the lower tube socket chute 64, they are handled by the control mechanism which is shown as associated with the sensor mechanism 226 in Fig. 33. The control mechanism slows the descent of the sockets and prevents them from dropping too rapidly into the magazine 68 and also separates the sockets and times their drop into the magazine so that they will not strike the feeler 230 of the sensor switch to give a false indication that the magazine is full.

The separating mechanism is shown with an upper plunger 402 and a lower plunger 404. These plungers extend into the chute 64 to stop the fall of the individual tube sockets 306. The plungers operate alternately with the lower plunger 404 as shown in the full line position in Fig. 33 holding the stack of tube sockets until the upper plunger 402 can move into the stack above the lowermost socket 306. When the upper plunger 402 moves into the chute to the dotted line position, it will support the stack while the lowermost plunger 404 moves to the dotted line position to release the bottom socket 306. The socket will then drop down into the magazine 68.

It will be noted that the plungers 402 and 404 are connected to the pivotally moving yoke 406 which supports the sensor switch 332. Thus when the sensor switch is swung so that the feeler 230 is in the magazine and in the path of the dropping tube sockets, the tube sockets are prevented from dropping by the lowermost plunger 404 and they will not accidentally strike the feeler 230 to close the switch and give a false impression that the magazine is full.

The lowermost plunger is pivotally connected by a pin 408 to the swinging yoke and the uppermost plunger is also connected by a pin 410 to the swinging yoke. The plungers 402 and 404 project through openings 412 and 414 in a guide plate 416 to cause them to project laterally into the chute. As the yoke swings to the solid line position of Fig. 33, the lowermost plunger 404 will be carried into the chute 64 and the uppermost plunger 402 moved out of the chute to permit the stack of tube sockets to settle against the lowermost plunger. As the yoke swings to the dotted line position of Fig. 33, the uppermost plunger moves into the chute to support the stack and the lowermost plunger moves out of the chute to drop the lowermost socket 306 into the magazine. The socket will, of course, not strike the feeler 230 of the sensor switch since that has been swung out of the way.

The mechanism for obtaining this swinging motion is shown in Fig. 32. The sensor yoke 406 is supported on pivotal shaft 234. The shaft is supported at its ends in bearings which are carried in the case 416 which houses the sensor operating mechanism. The pivotal motion of the shaft 324 to swing the yoke back and forth is obtained by a crank 418 connected to one end of the shaft 234. The crank arm 418 is connected by a link 420 to the rotating crank arm 422 mounted on a shaft 424. The shaft 424 carries a bevel gear 426 which is rotated by another bevel gear 428 carried on the drive shaft 430 of the motor 236.

The motor 236 also drives another sensor mechanism which is substantially the same as the sensor mechanism shown in Fig. 33 but is positioned to block the fall of the variable resistors as they drop down in chute 52 and to detect when magazine 70 is full. This sensor mechanism is mounted on a swinging yoke 432 which is pivotally supported on a shaft 434. Shaft 434 carries a crank arm 436 which is connected by a link 438 to a rotating crank arm 440 which is carried on the end of the motor drive shaft 430.

Thus as the sensor drive motor 236 operates, it will swing the yokes 226 and 432 of each of the sensor mechanisms. Only one of the sensor mechanisms will be functioning, however, since only one of the magazines will be in the filling position and only one type of electrical component is handled at one time.

*Variable resistor magazine loader*

The mechanism for holding the variable resistors is shown in Figs. 27 through 31. The variable resistor has the general shape shown in Figs. 28 and 29 with a body portion 442 which is cylindrical in shape having a flat base 444 and having a pair of contacts 446 and 448 projecting upwardly from the rim of the resistor. The magazine for supporting the resistors has a body portion 454 shaped to conform to the resistor. Channels 456 and 458 are provided for the projecting contacts 446 and 448. The body of the magazine is connected to a back 460 and a spring gate 462 carrying a gate member 463 is provided which prevents the resistors from dropping out of the magazine while it is being handled. This gate is cammed away from the mouth of the magazine 464 when it is in loading position. For this purpose, a cam may be provided which engages the spring gate to force it way from the mouth of the magazine as it is emptied into loading position.

The resistors 450 are fed from a hopper 44, Fig. 28, which is placed on the vibrator 43 in the same manner as the hoppers for handling the tube sockets and the disc capacitors. This hopper has an inclined ramp 452 which leads spirally up from the floor of the hopper and which vibrates to cause the individual resistors to climb the ramp. The ramp leads to a hopper chute 52 which has a special shape to orient the individual resistors.

As the resistors climb the ramp 452 they enter the orienting chute 52. The chute has a hollow shape substantially the depth of the resistor as may be seen in Fig. 29. The chute is trough-like in shape with an upper flange 466 extending outwardly over the trough and secured to one of the side walls 467 of the chute. An open portion 469 remains through which project the leads 446 and 448.

As the individual resistors climb the ramp 452, Fig. 28, to enter the chute 52, the leads 446, 448, and 449 may first strike the end 468 of the overhanging flange 466. The resistors being vibrated on the floor of the ramp will tend to rotate until they are turned so that the leads enter the open part 469 of the trough, as is illustrated by the resistor 450a. Since, due to the vibration of the hopper, the resistors have a tendency to climb up on the ramp 452, they will continue to push forwardly and will continue to rotate until they reach the position shown by the resistor 450a. In this position they will be permitted to slide down the chute 52.

The chute leads directly to the separating mechanism which is attached to the sensor mechanism supported on the yoke 432 as was described in connection with Fig. 32. The resistors pass through the separating mechanism being temporarily held by the plungers 470 in much the same manner as the tube sockets 306 as was described in connection with Fig. 33.

Thus individual resistors are dropped into the magazine and will continue to drop until the resistor sensor 474 indicates that the magazine has been filled. The magazine turret will then index a fresh magazine into position and move the full magazine to a location where it can be unloaded.

*Summary of operation*

In summary, the machine provided operates to fill magazines with electrical components having the shapes of either disc capacitors, tube sockets, or variable resistors. Most of the driving and operating mechanism is common to the devices which function for all three mechanisms.

In choosing which type of electrical component is to be handled, the operator places the appropriate hopper 44 on the vibrator 43. He then also places the appropriate type of magazines on the magazine turret 60. If disc capacitors are to be loaded, the operator pours the capacitors into the hopper and the disc capacitors are fed from the hopper and dropped into the chute 48, Figs. 1 and 2, and are slowed down as they pass through the zigzag section 112.

They are then dropped on the rotating plate 114 as shown in Fig. 4 whereupon they normally are caught in the pockets 116 in the plate. If not caught in the pockets, they are raked off the plate by the curved fence 120 which drops them into an overflow hopper 128 and this is periodically dumped back into the hopper 44.

The components which are caught in the pockets 116 are carried around with the rotating plate until they are engaged by the individual brushes 136 or 138 of the brush assembly wheel. These brushes sweep the components out of the pockets 116 to drop them into the aligning chute 56 which is shown in Figs. 10 and 11. The capacitors first are guided to a vertical position by the V-shaped upper end of the chute. The central open U-shaped portion of the chute causes them to rotate about a horizontal axis until the leads are extending forwardly. The condensers then pass into the closed portion of the chute and are later twisted through 90° to descend in a horizontal position onto the elevator plunger 138 which is shown in Figs. 16 and 17.

This plunger 188 intermittently ascends to force the capacitor shown in position 184 upwardly through the leaf springs 190 and into the magazine which is positioned above the opening 186. The leaf springs hold the stack of capacitors in the magazine until the magazine is full as determined by the swinging sensor switch shown in Fig. 33. This sensor switch intermittently inserts a feeler 230 into the magazine and when the feeler engages a condenser indicating that the condensers have been stacked up in the magazine to reach the top thereof, the machine is temporarily stopped and a new magazine is emptied into filling position.

Thus it will be seen that this mechanism has provided a simple efficient apparatus for loading small delicate condensers into a magazine in a position in which they are fully oriented. The apparatus is capable of automatic and relatively high speed operation and will continue operation indefinitely as long as new capacitors are supplied and the filled magazines are removed.

For use as a machine to load tube socket magazines, a tube socket hopper is placed on the vibrator 43 and the sockets are fed upwardly into a chute 50 as is shown in Figs. 24, 25, and 26. The sockets slide down the chute to a horizontal position on a plate 322 whereupon they are caught by the rotating star wheels 318 and 320 to be transferred into a pocket 324 in the rotating plate 326. When positioned in the pocket, a centering pin 358 projects upwardly into the spindle 280 of the tube socket to provide an axis about which the socket may rotate. The socket is then carried past a series of stationary brushes 366 which rotate the socket about the centering pin 358 until the notch 362 in the socket drops over the orienting key 382. When the socket has thus been oriented, the orienting key and the centering pin are both withdrawn from the tube socket and it is held in its oriented position by the guide rails 388 and 390 which channel the prong 292 and spindle 280 of the socket between them. An air jet 398 shoots the sockets out of the individual pockets of the rotating plate and down the chute 64, whereupon they drop into the magazine.

Before reaching the magazine, however, they must pass the control mechanism shown in Fig. 33. This mechanism has a pair of plungers 402 and 404 which are alternately projected into the chute to stop the fall of the sockets and drop individual sockets into the magazine, with the sockets being timed so that they will not accidentally strike the sensor finger 230 of the sensor switch. When the sensor finger engages a socket, it detects that the magazine is full and temporarily shuts off the machine until a new magazine is automatically rotated into filling position.

Again, a simplified mechanism has been provided with this mechanism functioning to orient tube sockets and fill them into a magazine. The mechanism is also capable of relatively fast operation and will operate continually without interruption so that the machine may provide a continuing supply of filled magazines for use with other automatic machinery.

If the machine is to be used for filling magazines with variable resistors, an appropriate hopper 44 is placed on the vibrator and the resistors will climb the ramp 452 of the hopper as shown in Fig. 28. The resistors will be temporarily stopped at the mouth of the chute 52 until they can rotate to a position where the resistors leads 446, 448, and 449 are positioned in the open portion 469 of the hopper beside the flange 466. In this position the resistors slide down the chute and pass into the magazines.

They are temporarily interrupted, however, by the sensor mechanism 474 as shown in Fig. 32 This sensor mechanism is similar to the mechanism shown in Fig. 33 and will separate the individual resistors and time their release to prevent them from striking the sensor switch to accidentally turn off the machine. When the sensor switch detects that the magazine is filled, a new magazine is moved into position.

With the operation of the machine in loading magazines with any of the three types of components, switches are provided, as shown in Fig. 34, which insure that a magazine will be in proper filling position before permitting the machine to continue operation. These switches are switch 272 which operates for the variable resistor magazines and switch 268 which operates for the disc capacitor and tube socket magazines. Another switch 270 is provided as a signal for the operator so that he will remember to remove the filled magazine from the turret. The switch also will stop the operation of the machine if a filled magazine is not removed within a reasonable time.

In Fig. 35 the circuit arrangement for operating the machine is shown in block diagram. The circuit includes a selector switch 490 which can be set to any of three positions to engage the contacts 492, 494, and 496. The selector switch is set in accordance with the type of component that is to be loaded into magazines by the machine.

The operating apparatus is supplied with electricity from an electrical supply indicated by the "Line" in Fig. 35. When the selector switch is set in the position to load disc capacitors the movable arm of the switch engages the contact 492. This closes the circuit through the disc capacitor clutch 344 which is also shown in its operating location in Fig. 1. The circuit is also completed through the main drive motor 148 so that the main drive motor and clutch will operate the separator mechanism shown generally at 54 in Fig. 1. By means of the drive sprocket 208, chain 206 and driven sprocket 204 the elevator mechanism 58 is operated to insert the oriented disc capacitors into the magazine.

The vibrator feeder 43 is also placed in the operating circuit with the switch at position 492 and the disc capacitors will begin to feed down the tortuous chute 48.

It will be noted from the diagram Fig. 35 that the sensor motor 236 will be placed in operation to cause the yoke which supports the sensor 226, which detects when the disc capacitor magazine is full, to swing the sensor switch back and forth to insert the feeler into the opening in the top of the magazine.

The overall machine will continue operating until the sensor switch shown at 226 in the circuit diagram is actuated by the magazine becoming filled. This breaks the circuit to the main drive motor 148 and to the vibrator feeder 43 causing them to stop feeding components. The circuit to the sensor motor 236 is also broken to cause the sensor to stop swinging in and out of the top of the mazazine. The sensor motor 236 will coast a short distance causing the sensor to swing back to the dotted line position of Fig. 3 so that the feeler 230 is withdrawn from the opening 228 in the magazine. In order to insure that the sensor will be moved to the out of the way position and remain at this position a brake mechanism 417 is provided which grips the shaft 234, on which the sensor is mounted, to stop any further pivotal movement of the sensor and to stop any further rotation of the sensor drive motor 236.

The sensor motor brake 417 is shown as time delay A in a circuit diagram of Fig. 35. This switch operates the brake after a fixed time delay after the sensor switch 226 has been actuated by the magazine being filled. Thus, after the sensor drive motor 236 has coasted a sufficient distance to move the sensor out of the path of the magazine, the time delay A will operate to cause the brake 417 to stop any further rotation of the motor. This keeps the sensor out of the way so that the magazine turret can index the magazine forward.

The indexing of the magazine turret 60 is also accomplished due to the actuation of the sensor switch 226. The turret as illustrated in Fig. 16 is indexed forward by the rocker arm 242 being pivoted in a counterclockwise direction by the piston rod 250 being operated by the air cylinder 248. This causes the pawl 240 to push on the ratchet teeth 238 to rotate the turret 60 counterclockwise in the direction of the arrow 258. To cause this operation the air valve 257 functions to admit air through the line 254 to cylinder 248 and to vent the air line 256.

The air valve 257 as shown in Fig. 35 is solenoid operated. When the magazine sensor switch 226 closes it completes the circuit through the forward magazine solenoid 498 to index the magazine forward and after a delay through the pawl return solenoid 500 to move the pawl back to engage a new tooth in the ratchet. These solenoids do not operate immediately on closure of the switch 226 since time delay B is present in the circuit ahead of the solenoids. This time delay relay B delays the operation of the magazine indexing turret for a sufficient length of time to permit the sensor motor 236 to coast and move the sensor switch out of the way of the magazine. After the time delay A has operated to brake the sensor motor 236 the time delay B will close to operate the forward magazine indexing solenoid 498. This operates the indexing air valve 257 to supply air to the cylinder 248 in Fig. 16 and cause the rocker arm 242 to pivot in a counterclockwise direction and index the magazine turret 60 forward.

The pawl return solenoid 500 does not operate immediately since time delay switch C does not close until some time after the time delay switch B has closed. This delay affords sufficient time for the magazine turret to index forward. When the time delay switch C eventually closes, the indexing air valve 257 is again operated to cause the rocker arm 242 and the pawl 240 which it carries at its end to pivot to return position so that the pawl 240 will engage a new ratchet tooth.

Time delay switch C has three contacts, the one shown at 500 for operating the pawl return solenoid, and the one shown at 502 for operating the time delay switch for restarting the main drive motor and the one shown at 503 for restarting the vibrator feeder 43. These switches are first opened when the disc capacitor sensor 226 is actuated and cannot close until a predetermined time has elapsed. When the switch C again closes it will complete the circuit through the drive motor and vibrator feeder to permit the machine to again begin operation to load disc capacitors into the magazine. The switch C will not close to restart the mechanism until time has been afforded for a new magazine to have been moved into place since the time delay B is a shorter delay than C. Since time delay switch C has three contacts 500, 502 and 503, it will be seen from the diagram of Fig. 35 that the pawl return solenoid 501 will return the pawl to engage a new tooth of the ratchet 100 in preparation for a new indexing operation at the same time that the main drive motor and the vibrator feeder restart.

It is essential, however, to the restarting of the machine that a new magazine be in position so that the disc capacitors will not be loaded into a space with no magazine in filling position. This is assured by the magazine position switch 268 which is illustrated in Fig. 34. If no magazine is in the filling position on the turret 60, then magazine position switch 268 will not be closed when the turret is indexed and this keeps the circuit open and will prevent the mechanism from restarting.

It is also essential to the restarting of the machine that the filled magazine be taken off the turret. Thus, if a filled magazine is left on the turret 60, the switch 270 will remain open and, as shown in the circuit diagram of Fig. 35, when this switch remains open the circuit is not completed through the main drive motor 148 and vibrator feeder 43. The switch 270 is positioned in Fig. 34 so that the first full magazine will actuate the switch and thus each magazine must be removed as it is filled and indexed to the removing position of the switch 270. The switch 270, however, may be positioned several stations away from the magazine loading position of the switch 268 so that the operator may let a few filled magazines accumulate before the switch 270 will be actuated to prevent the machine from restarting.

It will also be seen from Fig. 35 that the full magazine switch 270 is arranged when actuated to also close the circuit to a signal device shown at 504. This device may be an apparatus such as a horn, bell, or light which will indicate to the operator that the full magazine must be removed.

It will be seen from Fig. 35 that if the machine is to be used to load magazines with tube sockets that the selector switch 490 must be set to engage the contact 494. This will break the circuit to the disc capacitor clutch 344 and close the circuit to the tube socket clutch 337 as shown in Fig. 1. This will operate the tube socket separator and orienter 62 while permitting the disc capacitor separator 54 and loader 58 to remain stationary.

Setting the selector switch to engage contact 494 also closes the circuit through the tube socket sensor switch 474 and opens the circuit through the disc capacitor sensor switch 226. The remainder of the circuit is the same whether the selector switch is in the disc capacitor position 492 or the tube socket position 494. The circuit is completed to the drive motor 148 and vibrator 143 and through the sensor motor 236 which drives the tube socket sensor 474 as well as the disc capacitor sensor 226.

The function of the circuit in operation is also the same as with the disc capacitor. When the magazine becomes filled with tube sockets, a tube socket sensor switch 474 is opened and the sensor motor 236 coasts until the sensor switch 474 is out of the way of the tube socket magazine and then is automatically braked when time delay A operates the brake. The magazine turret will index forward after the sensor switch is out of the way due to operation of time delay B. The main drive motor 148 and vibrator feeder 43 will again start operation when the time delay switch C closes. This switch will also operate the pawl return solenoid to cause the pawl to move back to grip a new ratchet tooth.

When the machine is to be operated to load magazines with variable resistors, the selector switch 490 is moved to engage the contact 496. In this position the circuit is broken through the main drive motor 148 to permit the mechanism for separating and orienting the disc capacitors and for separating and orienting the tube sockets to remain stationary. The circuit will be completed through the vibrator 43 and through the sensor motor 236 as well as through the variable resistor sensor 474. The machine will then operate to feed variable resistors until the magazine becomes filled and opens the sensor switch 474. Actuation of switch 474 breaks the circuit through the sensor motor 236 and also stops the vibrator 43. The sensor motor will coast until the sensor 474, Fig. 32, is out of the way of the magazine 70 whereupon the time delay A will operate to brake the sensor motor and hold the sensor switch in its out of the way position. After this, the time delay switch B will close to operate the forward magazine indexing solenoid 498. This functions in the same manner as previously described, to operate the indexing air valve 257 and move a fresh magazine into place.

Subsequently, contacts 500 and 503 of the time delay switch C close to cause the vibrator again to operate and to move the pawl to its return position to engage a new tooth on the ratchet. Although switch contact 502 also closes, it has no effect since this is in an inactive circuit due to the setting of the selector switch 490. It will be noted that the magazine position switch 272 is also in this circuit and thus, if a new magazine is not properly positioned or if the operator has forgotten to place a new magazine on the turret 60, the circuit will remain open and the machine will not restart when time delay switch C 503 closes.

Also, if switch 270 remains open by failure to remove a filled magazine in that station of the turret, the circuit will not be closed to permit the machine to restart. As was previously stated, switch 270 may be placed in any location around the turret or an additional switch similar to 270 may be provided to operate with variable resistor magazines. The additional switch, if provided, could be placed in the circuit in series with switch 270 as shown in Fig. 35, or the switch 270 placed in the circuit adjacent the disc capacitor and tube socket sensor switch 226 and the new switch placed in the circuit adjacent the variable resistor sensor switch 474.

Thus it will be seen that the circuit provided functions completely automatically to cause the machine to keep operating as long as the operator removes the filled magazines and replaces fresh magazines. A main line switch may, of course, be provided at 506 to start the machine or stop the operation of the machine at the close of a working period. The sequence of operations of the brake for stopping the sensor motor, indexing of the magazine turret, and the restarting of the main drive motor and vibrator, and return of the indexing pawl may be accomplished by simple time delay relays which are inexpensive and reliable.

In the forming of electrical circuits, the described components, i. e., the disc capacitor, the tube socket, and the variable resistor, are among the less numerous components used. It is therefore not necessary to provide as rapid a supply of magazines containing these components to an automatic assembly machine as is necessary for the more popular components such as tubular resistors and condensers. If individual magazine loading machines are provided for these lesser used components, the machines will stand idle for a part of the time. Applicants therefore have provided a single machine which can be kept in continual operation by changing the type of components handled so that the unnecessary expense of providing a separate machine for each component is avoided.

When placed in use with an automatic circuit assembling machine, the present machine can provide an adequate supply of magazines for the machine and can keep up with a plurality of other loading machines which load components such as tubular condensers and resistors which components are required in greater number for each completed circuit.

It will therefore be seen that a saving in money and time has been effected in providing a single machine which is less costly and consumes less space than would be necessary with a plurality of machines. Further, a saving of time is also effected since an operator can handle a compact machine with greater efficiency.

The machine also presents many important new features for handling the individual types of components and these may be utilized by themselves for a single type of component without departing from the scope of the invention.

As will be noted, the machine also contains improved features for handling each type of component individually and is capable of continual long runs without adjustment or repair. The machine is simply built with rugged parts which do not require critical adjustment and therefore highly technical operators are not required for the operation of the machine.

We have, in the drawings and specification, presented a detailed disclosure of the preferred embodiments of our invention. It is to be understood that the invention is susceptible of modifications, structural changes and various applications of use within the spirit and scope of the invention and we do not intend to limit the invention to the specific form disclosed but intend to cover all modifications, changes and alternative constructions and methods falling within the scope of the principles taught by our invention.

We claim as our invention:

1. A mechanism for loading electrical components into magazines comprising an interchangeable hopper means for containing either disc capacitors or tube sockets, feeding means for interchangeably feeding the disc capacitors or tube sockets from the hopper, a chute positioned to receive disc capacitors from the feeding means, a capacitor separating and orienting mechanism positioned to receive disc capacitors from the chute, a loading member loading the capacitors into a magazine, supporting means for holding a magazine in capacitor receiving position relative to the loading member, a second chute adapted to receive tube sockets from the hopper with the upper end being displaced from the upper end of the disc capacitor chute, means to separate and orient a tube socket for delivery to a magazine, and means to support a magazine in socket receiving relationship to the separating and orienting means.

2. A mechanism for loading electrical components into magazines comprising a vibratory motor adapted to drive a vibratory conveyor within a hopper when the hopper is mounted on the vibrator, first and second interchangeable hoppers adapted to be mounted on the vibrator and having discharge spouts discharging from the hopper at different locations, a first chute positioned to receive a first type of component from the first hopper when it is placed on the vibrator, a second chute positioned to receive the second type of component from the second hopper when it is positioned on the vibrator, a magazine support adapted to support a magazine for the first type of component and also adapted to support in the same location a magazine for the second type of component, component orienting and loading means for the first component positioned between the lower end of the first chute and the first magazine when it is on the magazine support, and a component orienting and loading mechanism positioned between the end of the second chute and the second magazine as it is positioned on the magazine support, the machine being adapted to load magazines with either type of components by selecting the hopper that is placed on the vibrator.

3. A mechanism for loading electrical components into magazines comprising a vibrator motor adapted to drive a vibratory conveyor to discharge components from a hopper, a first hopper adapted to contain a first type of electrical component and discharge it therefrom when mounted on the vibrator, a second hopper adapted to handle a second type of component and discharge it therefrom when mounted on the vibrator, each of said hoppers having a discharge spout positioned to discharge in a different location, a first chute positioned to be aligned with the discharge spout of the first hopper, a second chute positioned to be aligned with the discharge spout of the second hopper, magazine loading means for the first type of component positioned to receive the components from the first chute and load them into a magazine, magazine loading mechanisms for the second type of component positioned to load the components into magazines, and means for supporting the magazines for receiving the components when they are loaded by the magazine loading mechanisms.

4. A mechanism for loading electrical components into magazines comprising means for interchangeably feeding either a first type of electrical component or a second type of electrical component, a first chute leading from the feeding means and adapted to convey a first type of component, a second chute leading from the feeding means and adapted to convey a second type of component, a first magazine loading mechanism for the first type of component positioned at the base of the first chute, a second magazine loading mechanism positioned at the base of the second chute and adapted to load a magazine with the second type of component, means for supporting magazines while receiving components from the magazine loading means, a power drive means for operating the magazine loading means, individual clutch means placed between the power drive means and the first and second magazine loading means, and means for engaging either of such clutch means to selectively operate one of the magazine loading means.

5. A mechanism for loading electrical components into magazines comprising a feeder for interchangeably feeding disc capacitors or tube sockets, a first chute adapted to receive disc capacitors from the feeder, a second chute adapted to receive tube sockets from the feeder, means positioned to receive disc capacitors from the first chute and separating and orienting the disc capacitors and loading them into a magazine, means positioned to receive the tube sockets from the second chute and separating and orienting the tube sockets and loading them into a magazine, a power means for driving the separating, orienting and loading means for both the disc capacitors and the tube sockets, and a magazine support for supporting the magazines to receive the disc capacitors and tube sockets as they are loaded into the magazines.

6. A mechanism for loading electrical components into magazines comprising a hopper means for alternately receiving loose components of a first type or of a second type, a feeder for feeding the components individually, a first magazine loading mechanism positioned to receive the first type of component from the feeder and having a component expelling section positioned to load the components into the bottom of a magazine, a second magazine loading mechanism positioned to receive a second type of component from the feeder and having a component expelling section positioned to load the components into the top of a magazine, and a magazine support positioned between said magazine loading mechanisms and adapted to hold either a first or a second type of magazine to receive the first type of components from the bottom or the second type of components from the top.

7. A mechanism for loading electrical components into magazines comprising means for selectively feeding a first type of component or a second type of component, means for receiving the components from the feeding means and for loading the first type of component into the lower end of the magazine, means for receiving the second type of components from the feeding means and for loading the components into the upper end of a magazine, a support for holding magazines in a loading position, said support located so that the components can be fed into the lower end or into the upper end of the magazine, and a sensor positioned to be at the upper end of the magazines in loading position and adapted to sense when the magazines are filled whether the components are fed from the lower or the upper end.

8. A mechanism for loading electrical components into magazines comprising a feeder receiving free disc condensers and discharging them individually, means positioned below the feeder for receiving the individual condensers and orienting them after they leave the feeder, a loading mechanism for inserting the individual condensers into the magazines after they have been oriented, means for supporting the magazines for receiving the condensers from the loading mechanism, and an enclosed oval shaped chute leading downwardly from the feeder to the orienting means with the chute forming a tortuous path between the feeder and the orienter to slow the descent of the condensers as they slide down through the chute and are received by the orienting means.

9. A mechanism for loading electrical components into magazines comprising a feeder for receiving free components and for discharging them individually, a separating mechanism positioned to receive the components from the feeder, the separating mechanism including a member revolving about a vertical axis and having pockets therein into which the individual components may drop, means for removing the components which do not drop in the pockets, and a magazine loading mechanism positioned to receive the individual components from the pockets and loading them into the magazine.

10. A mechanism for loading electrical components into magazines comprising a capacitor separating mechanism comprising a horizontally moving surface having pockets therein having horizontal dimensions shaped at least as large as the flat capacitor, means to move the surface in a lateral direction for depositing individual capacitors on said surface, a fence placed above the surface and extending laterally of the direction of movement of said surface so as to guide the capacitors which do not fall in the pockets off of the surface but permit those which fall in the pockets to pass beneath the guide fence, and an overflow container positioned to receive the capacitors which are moved off the surface by said guide fence.

11. A mechanism for loading component magazines comprising a rotating circular plate having a series of pockets in the outer edge which extend beneath the upper flat surface of the plate, driving mechanism for rotating the plate about a vertical axis, means for depositing a series of disc capacitors on the edge of the plate so that certain capacitors are caught in the pockets as the plate rotates, a fence extending in the direction of rotation of the plate from a position inside of the pockets to a position outside of the pockets so as to guide the capacitors which do not drop into the pockets to a position outside of the plate, and an overflow container positioned near the end of said fence to catch the capacitors which are guided off the plate by the fence.

12. A mechanism for loading electrical components into magazines comprising a moving surface having capacitor separating pockets therein, the pockets being open at one side, means for depositing individual capacitors in said pockets, a brush adapted to move toward the open side of the pocket at a discharge location to carry the individual capacitors out of a pocket, and magazine loading means receiving the capacitors from the separating pockets after they have been ejected by the brush, said loading means loading the individual capacitors into a magazine.

13. A mechanism for loading electrical components into magazines comprising a rotating circular plate having separated pockets at the edge which are open at the peripheral edge of the plate, a driving mechanism for rotating the plate about a vertical axis, means for depositing capacitors in said pockets, a brush adapted to rotate about a horizontal axis and positioned to engage the capacitors and carry them out of the pockets as they move to a discharge position with the plate, and magazine loading means positioned to receive the capacitors as they are brushed from the separate plate pockets.

14. A mechanism for loading electrical components into magazines comprising a moving separating surface having capacitor containing pockets of a size to contain individual capacitors and having an open side, means for moving said surface along to carry each pocket through a discharge position, means for depositing capacitors on said surface with the capacitors dropping into said pockets, a rotating brush having spaced groups of bristles with the bristles positioned to engage a capacitor in the pocket at discharge position, and means to drive the brush at a speed such that a group of bristles passes over each pocket to eject a capacitor each time a pocket appears at the discharge position.

15. A mechanism for loading electrical components into magazines comprising an orienting mechanism for orienting disc capacitors before they are loaded into the magazine, said orienting means including a chute having a bottom with parallel side walls spaced apart slightly greater than the thickness of the body of the capacitor and inclined downwardly so that the capacitors will roll downwardly until the leads are foremost to stop the body from rolling and cause it to begin to slide, means for delivering individual components to the orienting mechanism, and means at the bottom of the chute for receiving the individual capacitors and for loading them into a magazine.

16. A mechanism for loading electrical components into magazines comprising a downwardly inclined orienting chute for disc capacitors, the upper end of the chute being V-shaped so that the capacitor will slide with its edge downwardly in the V, a portion of the chute beneath the V being channel shaped with parallel side walls so that the capacitor will be upright while passing through this section of the chute and will roll until the leads extend foremost and then begin to slide, means for delivering individual capacitors to the chute, and loading means at the lower end of the chute adapted to receive the oriented components and to load them individually into a magazine.

17. A mechanism for loading electrical components into magazines comprising an orienting chute having an upper end and a lower end and inclined downwardly toward the lower end, means for delivering individual disc capacitors to the inclined chute, the upper portion of the chute being V-shaped to cause the edge of the capacitor to move down into the base of the V, the midportion of the chute being channel shaped with parallel walls which are separated slightly greater distance than the thickness of the capacitor to cause it to roll in an upright position until the leads extend forwardly and then begin to slide, the lower part of the chute being the same shape as the midportion but having the top closed so that the capacitor cannot tumble end over end, the lower end of the chute twisted through 90 degrees from a vertical to a horizontal position to deliver the capacitors in a horizontal position, and means at the lower end of the chute for loading capacitors into magazines.

18. A mechanism for loading electrical components into magazines comprising a straightening chute inclined downwardly for delivering disc capacitors to a magazine loading machine, separating means for delivering individual capacitors to the upper end of a chute, the upper section of the chute being V-shaped to cause the capacitor to assume a position with the edge thereof in the bottom of the chute, the V-shaped portion tapering to a narrow U-shaped portion with the walls parallel and spaced apart slightly greater than the thickness of the capacitor body to cause the capacitor to assume an upright position and roll about its central axis until the leads project forwardly and rest on the floor of the chute, the capacitor sliding thereafter, and a lower portion to the chute having a closed top but being shaped similar to the central portion to prevent the capacitor from tumbling end over end.

19. A mechanism for loading electrical components into magazines comprising means for supporting a magazine in a loading position with the bottom end of the magazine being open to receive disc capacitors, an elevator beneath the magazine and adapted to lift a capacitor up into the magazine, means for reciprocating the elevator in vertical reciprocation to lift the component into the magazine, and a plate positioned beside the path of the elevator and having V-shaped sides with the point of the V passing between the leads of the capacitor as it is raised to straighten the capacitor for insertion into the magazine.

20. A mechanism for loading electrical components into magazines comprising a support for a magazine at a magazine loading station, means for loading individual components into the magazine, the magazine being provided with a lateral access opening near the top end, a sensor member connected to terminate the operation of the loading means when the sensor member engages a component, and means for alternately moving the sensor member into said opening in the magazine, the sensor member engaging the top component when the magazine is filled.

21. A mechanism for loading electrical components into magazines comprising a magazine supporting apparatus for holding the magazine at a filling station, a filler for depositing individual components into a magazine, a sensor finger adapted to move into an opening at the top of the magazine to engage the uppermost components when the magazine becomes filled, switch means connected to be actuated by the sensor member when it engages a component as the magazine becomes filled, and an electrical circuit for operating the magazine filler, said switch means connected to said electrical circuit to open the circuit and stop the operation of the filler when the magazine becomes filled.

22. A mechanism for loading electrical components into magazines comprising means for feeding individual tube sockets to an orienting mechanism, means to rotate the tube socket about its axis until the pins are oriented, means for delivering the sockets to a tube socket loading mechanism while maintaining their relative oriented position, and means to load the oriented tube sockets into a magazine.

23. A mechanism for orienting electrical components such as tube sockets comprising means for delivering individual tube sockets to a straightening mechanism, means to support the sockets for rotation about a vertical axis, means to rotate the tube sockets about the vertical axis, means to stop the rotation of tube sockets when they have become properly oriented, and means to deliver the tube sockets from the straightening mechanism to a filling mechanism.

24. A mechanism for loading electrical components into magazines comprising a conveyor for moving individual tube sockets to an orienting mechanism, means for delivering the individual sockets to the conveyor, stationary socket rotating elements positioned beside the tube sockets and engaging the sockets as they are moved by the orienting mechanism and thereby rotate the sockets, means to stop the rotation of the sockets when they are in the proper oriented position, and means to deliver the oriented sockets to a magazine loading mechanism for inserting the individual sockets into magazines.

25. A mechanism for loading electrical components into magazines comprising transporting means adapted to support the sockets in a position with their contacts projecting upwardly, means to deliver the individual sockets to the transporting mechanism, a row of stationary brushes projecting into the path of the sockets as they are carried by the transporting means causing the sockets to be rotated, means to stop the rotation of the sockets when they have reached their proper oriented position, and a magazine loading mechanism receiving the sockets from the transporting means after they have been oriented.

26. A mechanism for orienting electrical components such as tube sockets comprising means for transporting the sockets resting on their base through an orienting machine, socket rotating elements adapted to rotate the sockets while they are being transported, means to deliver individual sockets to the transporting means, and a projection extending upwardly beneath the tube socket body to move into the notch on the base when the tube socket has reached the proper oriented position to stop the socket from further rotation.

27. A mechanism for loading electrical components such as tube sockets into magazines, the sockets having a base portion with a notch in their peripheral edge, the mechanism comprising a flat carrying surface adapted to carry the socket through an orienting mechanism, an orienting pin adapted to project upwardly from the carrying surface to pass into the notch of the tube socket to stop its rotation when it has been properly oriented, means to deliver individual tube sockets to the carrying surface, means for raising the orienting pin above said surface after the individual sockets have been positioned on the surface, means for rotating the sockets after they have been positioned on the surface until the rotation is stopped by the pin moving into the notch, and loading means adapted to receive the oriented sockets from the carrying element and to load them into magazines.

28. A mechanism for loading electrical components into magazines comprising means for feeding individual tube sockets to an orienting apparatus including a chute down which the sockets slide on their base with their pins projecting upwardly, a rotating star wheel having teeth with spaces therebetween, the teeth adapted to engage the base of the socket to deliver it to a transferral mechanism, a transferral mechanism having a flat surface on which the sockets rest, means to rotate the tube sockets while they are carried on the transferral mechanism, means to stop the rotation of the sockets when they are in the proper oriented position, and magazine loading means adapted to receive the sockets from the transferral mechanism and load them into magazines.

29. A mechanism for loading electrical components such as tube sockets into magazines comprising an orienting apparatus having means to rotate the tube sockets, and means to stop the rotation of the sockets when they are in proper oriented position, a pair of horizontal star wheels for delivering the individual sockets to the orienting mechanism including a first star wheel having spaced teeth to cradle the base of a tube socket therebetween and a second star wheel having similarly spaced teeth with the second star wheel angularly advanced from the first so that the teeth will engage the center pin of the tube socket while the first star wheel is engaging the base thereof, means to deliver individual tube sockets to the star wheels, and means to rotate the star wheels about their vertical axis.

30. A mechanism for loading electrical components into magazines comprising means for delivering individual components such as tube sockets into an orienting mechanism, a support pin about which the tube socket may be rotated, means for elevating the support pin into the spindle of the tube socket, means for moving the support pin forward to carry the socket along a path, means to rotate the tube socket while it is supported on the support pin, means to stop the rotation of the tube socket when it has reached an oriented position, means to withdraw the support pin from the tube socket after it has reached an oriented position, and magazine loading means positioned to receive the tube socket after it has been oriented and depositing it in a magazine.

31. A mechanism for loading electrical components such as tube sockets into magazines comprising means for supporting the tube sockets while they are rotated into oriented position, means to rotate the sockets to oriented position, means to stop the rotation of the sockets when the sockets are in the proper oriented position, a pair of guide rails, a socket support surface beneath the rails supporting the sockets so that the pins thereof project upwardly between the guide rails to maintain the socket in oriented position, and socket loading means adapted to receive the individual sockets from the guide rails after they have been oriented and load them into magazines.

32. A mechanism for loading electrical components such as tube sockets into magazines comprising a surface on which the sockets are supported while transported along an orienting path, a pin which is projected into the spindle of the tube socket to support the socket for rotation, means to deposit individual sockets on said surface, means to lift the pin into the tube socket spindle after the socket has been positioned on the surface, an orienting pin also adapted to be raised above said surface for engagement in a notch in the periphery of the tube socket, means for lifting the orienting pin above the said surface after the socket has been deposited thereon, a loader for receiving the oriented sockets and loading them into a magazine, and means for rotating the sockets after they have been supported by the centering pin until their rotation is stopped by the orienting pin passing into the notch on the socket periphery.

33. A mechanism for loading electrical components into magazines comprising means for supporting a magazine in loading position, a chute down which the component slides to pass into the magazine, means for delivering individual components to the chute, a sensor mechanism adapted to alternately move into and out of an opening at the top of the magazine to engage the uppermost component when the magazine becomes filled, means associated with the sensor apparatus to stop the supply of sockets to the chute when the magazine is full and the sensor engages a component in the magazine, and a gate positioned in the lower end of the chute to hold and release the components at a frequency so that they avoid striking the sensor mechanism when it is positioned in the top end of the magazine.

34. A mechanism for loading electrical components into magazines comprising means for supporting a magazine in loading position, a chute positioned above the magazine and adapted to deliver individual components to the magazine, a sensor adapted to move into and out of the magazine at periodic intervals to engage the uppermost component in the magazine when the magazine becomes filled, means to stop the supply of components to the chute when the sensor registers that the magazine is filled, a mount on which the sensor is secured, means for moving the carriage alternately to move the sensor into and out of the top end of the magazine, and interrupting means positioned in the bottom of the chute and secured to said sensor mount to control the release of the components into the magazines to prevent them from striking the sensor during the time it is positioned in the magazine.

35. A mechanism for loading electrical components into magazines comprising means for supporting a magazine in loading position, a chute positioned above the magazine when it is in loading position, means for supplying components to the chute, a sensor mechanism adapted to be moved intermittently into and out of the top of the magazine to sense when the magazine becomes filled, a pivotal support for the sensor unit, a lower feeder pin extending into the chute, and an upper feeder pin spaced from the lower pin and also arranged to extend into the chute, the feeder pins being connected to the pivotal support for the sensor and adapted to alternately move into the chute as the feeder pivots, with the lower pin being removed from the chute to drop the lowermost component when the upper pin is positioned in the chute to support the stack of components in the chute and the lower pin projecting into the chute when the uppermost pin is removed to permit the stack to move downwardly within the chute.

36. A mechanism for loading electrical components such as variable resistors having terminals projecting upwardly from the body into a magazine comprising a vibratory conveyor adapted to cause the resistors to move forward on a flat surface, restrictive walls projecting upwardly from the flat surface to keep the resistor within the confines of the surface, a blocking member positioned above the supporting surface to permit the body of the capacitor resistor to pass thereunder but blocking the terminals so that the resistor can pass only when the resistor has rotated to a position so that the terminals are at one side of the blocking member, a chute extending downwardly from the blocking member and having means to maintain the resistor in its oriented position, and means to support a magazine beneath the chute in loading position.

37. A mechanism for loading electrical components into magazines comprising a surface on which the components are carried forward, means for vibrating the surface to cause the components to move along said surface, walls on either side of said surface to restrict the movement of the component to a path along said surface, a chute leading downwardly from the surface to direct the components to a magazine, and an orienting flange projecting outwardly over the surface and spaced therefrom and also spaced from one of said walls so that the component will rotate on the vibratory surface until the upwardly projecting leads move between the flange and the wall to permit the component to move past the flange into the chute.

38. A mechanism for loading electrical components such as variable resistors into a magazine comprising a vibratory conveyer adapted to move the resistors forwardly, a vibratory conveyer spout, a chute leading downwardly from the spout, a flange extending part way into the spout and spaced from the bottom thereof to cause the components to rotate on the conveyer to the proper position before entering the chute, means at the bottom of the chute for timing the release of the components, a magazine support at the bottom of the chute, and a sensor mechanism adapted to be intermittently moved into and out of the top of the magazine to sense when the magazine is filled, said component release means timing the release of the components so that they will not strike the sensor when it is positioned in the magazine.

39. A mechanism for loading electrical components into magazines comprising means for supporting a magazine in loading position, means for delivering individual components to the magazine, a sensor mechanism adapted to be intermittently moved into and out of the top of the magazine to engage the uppermost component when the magazine becomes full, the sensor mechanism associated with said component delivery means and operable to stop the operation of the delivery means when the magazine becomes filled, means to temporarily withdraw the sensor mechanism from the magazine when the magazine becomes full, means for moving a new magazine into filling position when the sensor indicates that the magazine is full, and means to cause the sensor to again begin operation when a new magazine is moved into loading position.

40. A mechanism for loading electrical components into magazines comprising means for supporting a magazine in loading position, a loader for delivering individual components to the magazine, means for separating and orienting individual components and passing them to the loader, supply means connected to supply components to the separating and orienting means, means positioned to sense when the magazine becomes filled, means to move the filled magazine to a delivery position, and a signal device manifesting the presence of a filled magazine in the delivery position so that the operator will remove the magazine from the delivery position.

41. A mechanism for loading electrical components into magazines comprising means for separating and orienting electrical components, means for supporting magazines in filling position, means to deliver the individual separated and oriented components to the magazines, component sensing means positioned to sense when the magazine is filled, a transfer device connected to move the filled magazine out of filling position to a delivery position, and magazine sensing means operative to sense when the magazine in delivery position is not removed and terminating operation of the separating and orienting means if the magazine is not removed within a predetermined time.

42. A mechanism for loading a plurality of electrical components into magazines comprising means for separating and orienting a first type of component, means for loading the first type of component into a magazine, means for separating and orienting a second type of component, means for loading the second type of component into a magazine, means for supporting a first and second magazine in loading positions for receiving either the first or second type of component, a pair of component sensing members adapted to intermittently move into and out of the magazines, means for driving the component sensing members simultaneously, and means associated with the sensing members and adapted to stop the operation of the orienting and separating means for the components when the magazines become filled.

References Cited in the file of this patent

UNITED STATES PATENTS

| | | |
|---|---|---|
| 2,556,214 | Pottle | June 12, 1951 |
| 2,697,507 | Vergobbi | Dec. 21, 1954 |